US009958062B2

(12) United States Patent
Honma et al.

(10) Patent No.: US 9,958,062 B2
(45) Date of Patent: May 1, 2018

(54) CONTROL DEVICE FOR CONTINUOUSLY VARIABLE TRANSMISSION

(71) Applicant: JATCO Ltd, Fuji-shi, Shizuoka (JP)

(72) Inventors: Tomoaki Honma, Isehara (JP); Seiichiro Takahashi, Isehara (JP); Takahiro Kobayashi, Higashikurume (JP); Takashi Eguchi, Machida (JP); Hisao Nobu, Hachioji (JP); Kenji Sakakibara, Sagamihara (JP)

(73) Assignee: JATCO Ltd, Fuji-Shi (JP)

( * ) Notice: Subject to any disclaimer, the term of this patent is extended or adjusted under 35 U.S.C. 154(b) by 45 days.

(21) Appl. No.: 15/125,907

(22) PCT Filed: Feb. 26, 2015

(86) PCT No.: PCT/JP2015/055518
§ 371 (c)(1),
(2) Date: Sep. 13, 2016

(87) PCT Pub. No.: WO2015/146449
PCT Pub. Date: Oct. 1, 2015

(65) Prior Publication Data
US 2017/0002924 A1 Jan. 5, 2017

(30) Foreign Application Priority Data
Mar. 27, 2014 (JP) .................... 2014-066022

(51) Int. Cl.
*F16H 59/00* (2006.01)
*F16H 61/00* (2006.01)
(Continued)

(52) U.S. Cl.
CPC ............ *F16H 61/662* (2013.01); *F16H 9/16* (2013.01); *F16H 61/66272* (2013.01); *F16H 61/0021* (2013.01)

(58) Field of Classification Search
CPC ......... F16H 61/66272; F16H 61/66259; F16H 61/12; Y10T 477/624; Y10T 477/6242
(Continued)

(56) References Cited

U.S. PATENT DOCUMENTS 4,557,706 A * 12/1985 Tanaka .............. F16H 61/66259
474/18
5,211,083 A * 5/1993 Hattori .................. F16H 61/143
192/3.3

(Continued)

FOREIGN PATENT DOCUMENTS

JP 2004-100736 A 4/2004

*Primary Examiner* — Henry Y Liu
(74) *Attorney, Agent, or Firm* — Foley & Lardner LLP

(57) ABSTRACT

A CVTECU includes a secondary-pressure control section and a line-pressure control section that performs a same-pressure control to equalize a line pressure and a secondary pressure with each other if a predetermined start condition is satisfied. The line-pressure control section realizes a same-pressure state between the line pressure and the secondary pressure by lowering the line pressure below a target secondary pressure, and then controls the line pressure such that an actual secondary pressure is brought to the target secondary pressure by hydraulic feedback control while maintaining the same-pressure state. The secondary-pressure control section includes a restriction section that restricts an accumulation of integral term of an integral action for a duration between a time point at which the actual secondary pressure starts to be pushed down and a time point at which the same-pressure state between the line pressure and the secondary pressure is realized.

7 Claims, 7 Drawing Sheets

(51) Int. Cl.
 *F16H 63/00* (2006.01)
 *F16H 61/662* (2006.01)
 *F16H 9/16* (2006.01)

(58) Field of Classification Search
 USPC .......................................................... 474/28
 See application file for complete search history.

(56) References Cited

U.S. PATENT DOCUMENTS

| | | | | |
|---|---|---|---|---|
| 5,556,346 | A * | 9/1996 | Genzel | F16H 61/66272 474/18 |
| 5,885,178 | A * | 3/1999 | Luh | F16H 61/66259 417/15 |
| 5,967,918 | A * | 10/1999 | Knapp | F16H 61/66254 318/491 |
| 6,090,000 | A * | 7/2000 | Senger | F16H 61/12 474/18 |
| 6,219,608 | B1 * | 4/2001 | Abo | F16H 61/66259 474/28 |
| 6,311,113 | B1 * | 10/2001 | Danz | F16H 61/66259 474/28 |
| 6,350,216 | B1 * | 2/2002 | Speicher | B60K 31/00 474/28 |
| 6,358,167 | B1 * | 3/2002 | Holtmann | F16H 61/66259 474/18 |
| 6,387,000 | B1 * | 5/2002 | Eisenbacher | F04C 14/26 474/18 |
| 6,454,675 | B2 * | 9/2002 | Asayama | B60W 10/06 474/28 |
| 6,459,978 | B2 * | 10/2002 | Taniguchi | B60W 10/107 474/11 |
| 6,464,603 | B1 * | 10/2002 | Reuschel | F16H 61/66254 474/28 |
| 6,513,610 | B2 * | 2/2003 | Ochiai | B60K 31/0008 180/176 |
| 6,517,455 | B1 * | 2/2003 | Van Wijk | F16H 61/0021 474/18 |
| 6,527,668 | B2 * | 3/2003 | Vorndran | F16H 57/0413 474/28 |
| 6,813,551 | B2 * | 11/2004 | Taniguchi | F16H 61/66259 474/28 |
| 7,169,070 | B2 * | 1/2007 | Jozaki | F16H 61/12 474/18 |
| 7,294,075 | B2 * | 11/2007 | Yamaguchi | F16H 61/66272 474/28 |
| 7,402,118 | B2 * | 7/2008 | Kimura | F16H 61/66254 474/18 |
| 7,666,110 | B2 * | 2/2010 | Iwatsuki | F16H 61/66272 474/28 |
| 7,670,239 | B2 * | 3/2010 | Suzuki | F16H 61/12 474/18 |
| 7,699,729 | B2 * | 4/2010 | Inoue | F16H 61/66259 474/18 |
| 7,789,780 | B2 * | 9/2010 | Iwasa | F16H 59/70 474/18 |
| 7,819,764 | B2 * | 10/2010 | Kimura | F16H 61/66259 474/18 |
| 7,918,753 | B2 * | 4/2011 | Murakami | F16H 61/66272 474/18 |
| 7,922,610 | B2 * | 4/2011 | Nihei | F16H 61/0021 474/18 |
| 7,993,225 | B2 * | 8/2011 | Ogata | F16H 61/12 474/28 |
| 7,998,006 | B2 * | 8/2011 | Nihei | F16H 61/66259 474/18 |
| 8,002,654 | B2 * | 8/2011 | Oshiumi | F16H 61/66272 474/28 |
| 8,062,156 | B2 * | 11/2011 | Nishida | F16H 61/66272 474/18 |
| 8,157,681 | B2 * | 4/2012 | Iwasa | F16H 61/66259 474/28 |
| 8,357,063 | B2 * | 1/2013 | Sakaue | F16H 61/66259 474/18 |
| 8,412,636 | B2 * | 4/2013 | Katou | F16H 61/66272 474/18 |
| 8,827,850 | B2 * | 9/2014 | Kodama | F16H 61/66259 474/11 |
| 2004/0116245 | A1 * | 6/2004 | Yamamoto | F16H 61/0021 477/46 |

* cited by examiner

CONTROL DEVICE FOR CONTINUOUSLY VARIABLE TRANSMISSION

TECHNICAL FIELD

The present invention relates to a control device for a belt-type continuously variable transmission which continuously changes and outputs rotational speed of an engine, a motor or the like that is a drive source of a vehicle.

BACKGROUND ART

A belt-type continuously variable transmission (hereinafter referred to as "CVT") is constituted by winding a belt around an input-side primary pulley and an output-side secondary pulley. Torque of the engine is inputted to the input-side primary pulley, and the output-side secondary pulley outputs torque to wheels. Each of the primary pulley and the secondary pulley includes a fixed pulley and a movable pulley which form a V-groove. Each of the movable pulleys is biased toward the fixed pulley by a primary pulley pressure (hereinafter referred to as "primary pressure") or a secondary pulley pressure (hereinafter referred to as "secondary pressure") which is produced by using a line pressure as a base pressure. Accordingly, the belt is sandwiched and held by the pulleys, and a power transmission is conducted between the primary pulley and the secondary pulley.

Because the line pressure is produced by using a discharge pressure of an oil pump as a base pressure, it is known that a level of the line pressure has a great influence on fuel economy. Moreover, in the case that the line pressure is high beyond necessity, there is a possibility that friction in rotating or sliding parts of the transmission is worsened. Hence, a technique to improve the fuel economy has been proposed in which the line pressure is lowered down to a necessary pulley-pressure level so that the discharge pressure of the oil pump is lowered to reduce the friction.

For example, in a line-pressure control device disclosed in Patent Literature 1, a target line pressure is set to be equal to a needed primary pulley pressure or a needed secondary pulley pressure, whichever is greater. That is, a fuel efficiency is enhanced by adjusting the line pressure to a minimum necessary value. Moreover, in this technique, the line pressure is designed not to be uselessly corrected by removing an influence on the line pressure control which is caused due to installation error of a shift actuator or the like, in a HIGH-side region where the primary pressure is higher than the secondary pressure. Accordingly, a worsening of fuel economy which is caused due to excess of the line pressure and a non-attainment of target speed ratio which is caused due to shortage of the line pressure are suppressed.

In the case of Patent Literature 1, the needed secondary pulley pressure is calculated based on an actual speed ratio and an input torque, and a feedback control is conducted according to a difference between the needed secondary pulley pressure and an actual secondary pulley pressure sensed by a sensor. That is, a pressure-reducing valve interposed in an oil passage connected to a secondary pulley chamber is controlled by way of feedback control such that the actual secondary pulley pressure is brought to the needed secondary pulley pressure.

The technique of Patent Literature 1 in which the line pressure is controlled to become equal to the needed primary pulley pressure is particularly beneficial when the speed ratio is in the HIGH side. Also when the speed ratio is in LOW side, the line pressure is controlled to become equal to the needed secondary pulley pressure. Hence, the friction can be reduced over an entire range of the speed ratio. That is, by controlling the line pressure in conformity with higher one of the primary pulley pressure and the secondary pulley pressure, the fuel efficiency can be enhanced while ensuring the minimum necessary level of the line pressure.

Normally in the CVT, an actual pulley pressure is brought to a target value (i.e. target pulley pressure) by way of feedback control. Hence, a pulley-pressure sensor for sensing the actual pulley pressure is provided in order to perform the feedback control. For example, in the case that the line pressure is controlled to become equal to the secondary pressure because the speed ratio is in the LOW side, the fuel efficiency can be enhanced by bringing the actual line pressure to a target secondary pressure. However, the actual line pressure cannot be directly grasped if a hydraulic sensor for sensing the actual line pressure is not provided.

Therefore, the actual line pressure and the target secondary pressure are equalized with each other (hereinafter referred to as "same-pressure control") by previously controlling the target line pressure. By so doing, a detection value of the pulley-pressure sensor (secondary pressure sensor) for sensing the actual secondary pressure can be used as a value corresponding to the actual line pressure. Hence, a structure in which the detection value of the secondary pressure sensor is brought to the target secondary pressure by way of feedback control is valid.

In the case that the same-pressure control which equalizes the line pressure and the secondary pressure with each other is conducted in execution of the feedback control of the secondary pressure, the target line pressure has only to be reduced from its current value. That is, by reducing the target line pressure, an upper limit value of the secondary pressure is restricted by the actual line pressure when the actual line pressure is lower than a set value of the secondary pressure. If the target line pressure is reduced in this state, the actual secondary pressure is pushed down with the reduction of the target line pressure. By such a process, it is detected that a same-pressure state between the actual line pressure and the actual secondary pressure has been completed, and after that, the actual secondary pressure can be regarded as corresponding to the actual line pressure. Accordingly, a control amount (i.e. feedback correction amount) of the feedback control by which the actual secondary pressure is brought closer to the target secondary pressure is reflected in a control of the target line pressure. By so doing, this line pressure control can adjust the actual secondary pressure to the target secondary pressure while maintaining the same-pressure state between the actual line pressure and the actual secondary pressure.

However, the following problem was discovered. That is, if an upshift is conducted when the secondary pressure is under control of the same-pressure control with the line pressure as mentioned above, a shift shock unintended by a driver occurs. Specifically, when the primary pressure is increased in order to conduct the upshift, the line pressure is increased with this increase of the primary pressure from the same-pressure state realized between the line pressure and the actual secondary pressure. At this time, the actual secondary pressure is temporarily dragged by the line pressure so that the actual secondary pressure upwardly deviates from the target secondary pressure. Afterwards, the actual secondary pressure rapidly drops toward the target secondary pressure so as to cause the shift shock.

One cause of this phenomenon is a structure in which a command value of the secondary pressure continues to be calculated by way of feedback control such as a PI control or a PID control based on a difference (=Target Value−Sensor Value) between the actual secondary pressure (i.e. sensor value) sensed by the sensor and the target secondary pressure (i.e. target value).

That is, even under the same-pressure control, the correction amount continues to be calculated such that the sensor value of the secondary pressure is brought to the target value of the secondary pressure by the feedback control. A value given by adding this correction amount to the target value of the secondary pressure is set as the command value. In particular, when the line pressure is lowered temporarily below the target secondary pressure in order to equalize the line pressure and the secondary pressure with each other in early phase of the same-pressure control, the actual secondary pressure decreases below the target secondary pressure so that the target value and the sensor value become in a deviated state from each other.

During such a period, this deviation between the target value and the sensor value is accumulated by an integral action of the feedback control and is added to the target value of the secondary pressure as the correction amount. Hence, the command value of the secondary pressure is set at a value higher than the target value by the correction amount.

Moreover, there is a case that the same-pressure control between the line pressure and the secondary pressure is terminated when a target primary pressure rises to vary the speed ratio from its current ratio toward an upshift side (HIGH side).

In this case, the line pressure rises because of the rise of the target primary pressure. At this time, the actual secondary pressure does not follow the target secondary pressure but rises by being dragged by the rise of the line pressure. As a result, the actual secondary pressure becomes higher than the target secondary pressure. Then, it is considered that the actual secondary pressure decreases to converge into the target value when an accumulated volume of the correction amount of the secondary pressure is resolved by calculations.

Such a fluctuation of the actual secondary pressure directly affects the speed ratio. In particular, when the speed ratio changes from a LOW-side operating state to a HIGH-side operating state (i.e. upshift) in execution of the same-pressure control so that a magnitude relation between the secondary pressure and the primary pressure is inverted, the speed ratio fluctuates due to the fluctuation of the actual secondary pressure in spite of in-progress of the upshift. In this case, a vehicle occupant sometimes feels a shift shock.

CITATION LIST

Patent Literature

Patent Literature 1: Japanese Patent Application Publication No. 2004-100736

SUMMARY OF THE INVENTION

It is therefore an object of the present invention to provide a control device for a continuously variable transmission, devised to improve the fuel economy by controlling the line pressure to its minimum necessary while reducing a shift shock which is possibly caused at the time of upshift. It is noted that advantageous effects which are produced by respective configurations in an after-described embodiment according to the present invention and which are not obtained by conventional technology can be another object(s) of the present invention.

Solution to Problem (1) According to one aspect of the present invention, there is provided a control device for a continuously variable transmission including an input-side primary pulley, an output-side secondary pulley, and a belt wound around the primary and secondary pulleys, the control device comprising: a secondary-pressure control means configured to control a secondary pressure which is supplied to the secondary pulley, by a command secondary pressure, wherein the command secondary pressure is given by a feedback control including an integral action based on a difference between a target secondary pressure and an actual secondary pressure, the target secondary pressure is a target value of the secondary pressure, and the actual secondary pressure is a detection value of the secondary pressure; and a line-pressure control means configured to perform a same-pressure control that equalizes a line pressure and the secondary pressure with each other if a predetermined start condition is satisfied, wherein the predetermined start condition includes an operating state where the secondary pressure is higher than a primary pressure which is supplied to the primary pulley.

The line-pressure control means is configured to realize a same-pressure state between the line pressure and the secondary pressure by lowering the line pressure below the target secondary pressure in the same-pressure control, and then control the line pressure by a command line pressure given such that the actual secondary pressure is brought to the target secondary pressure by the feedback control based on the difference between the target secondary pressure and the actual secondary pressure while maintaining the same-pressure state.

Moreover, the secondary-pressure control means includes a restriction means configured to restrict an accumulation of integral term of the integral action for a duration between a time point at which the actual secondary pressure starts to be pushed down by the line-pressure control means and a time point at which the same-pressure state between the line pressure and the secondary pressure is realized. It is noted that the time point at which the actual secondary pressure starts to be pushed down by the line-pressure control means is a time point at which the actual secondary pressure starts to be lowered below the target secondary pressure by the reduction of the line pressure.

(2) It is favorable that the restriction means is configured to restrict the accumulation of integral term by changing an integration gain for the hydraulic feedback control.

(3) It is favorable that a map for the integration gain which is set according to a difference given by subtracting the actual secondary pressure from the target secondary pressure is provided, and the restriction means is configured to change the integration gain by applying the difference to the map.

(4) Moreover, it is favorable that the map is set such that the integration gain when the difference is large is smaller than that when the difference is small.

(5) Moreover, it is favorable that the control device further comprises a judgment means configured to determine that the same-pressure state has been realized when a difference given by subtracting the actual secondary pressure from the target secondary pressure becomes greater than or equal to a predetermined same-pressure determination value after the line pressure is reduced by the command line pressure such that the actual secondary pressure is lowered below the target secondary pressure in the same-pressure control.

(6) It is favorable that the secondary-pressure control means is configured to increase the target secondary pressure by a predetermined pressure before the line pressure is reduced by the line-pressure control means, if the start condition is satisfied.

(7) It is favorable that the predetermined pressure is greater than or equal to a value by which the actual secondary pressure is pushed down by the line pressure in the same-pressure control.

According to the disclosed control device, in the same-pressure control which equalize the line pressure and the secondary pressure with each other, the line pressure is reduced by the command line pressure given such that the actual secondary pressure is lowered below the target secondary pressure. By so doing, the line pressure and the secondary pressure become in the same-pressure state. For the duration between a time point at which the actual secondary pressure starts to be pushed down by the line pressure and a time point at which the same-pressure state between the line pressure and the actual secondary pressure is realized, the accumulation of integral term by the integral action is restricted.

Accordingly, when the same-pressure state between the line pressure and the secondary pressure is ended, a deviation amount of the actual secondary pressure from the target secondary pressure which is caused by being dragged by the rise of the line pressure can be small. Moreover, a time duration until the actual secondary pressure converges into the target secondary pressure after the actual secondary pressure deviated from the target secondary pressure can be shortened. Therefore, the magnitude of unintended shift shock at the time of upshift which occurs under the same-pressure control can be reduced to a degree which does not affect a drivability. Moreover, a time length for which a vehicle occupant can feel a shock can be shortened.

Moreover, in the case that the same-pressure control which causes the line pressure to become equal to the secondary pressure is executed in the operating state where the secondary pressure is higher than the primary pressure, the unintended shift shock can be reduced at the time of upshift as mentioned above. Hence, the line pressure can be controlled at its minimum necessary level. Accordingly, in a predetermined operating region, the discharge pressure of the oil pump can be lowered, so that the friction of the transmission can be reduced. Therefore, the fuel economy can be improved.

BRIEF EXPLANATION OF DRAWINGS

FIG. 7(a) shows actual hydraulic variations with respect to hydraulic command values and target values. FIG. 7(b) shows a correction amount FB which is integrated by the secondary-pressure control section. FIG. 7(c) shows a variation of an actual speed ratio relative to a target speed ratio.

FIG. 8(a) shows actual hydraulic variations with respect to hydraulic command values and target values. FIG. 8(b) shows the correction amount FB which is integrated by the secondary-pressure control section without the restriction section.

FIG. 8(c) shows a variation of the actual speed ratio relative to the target speed ratio.

DETAILED EXPLANATION OF THE INVENTION

Figure 1:
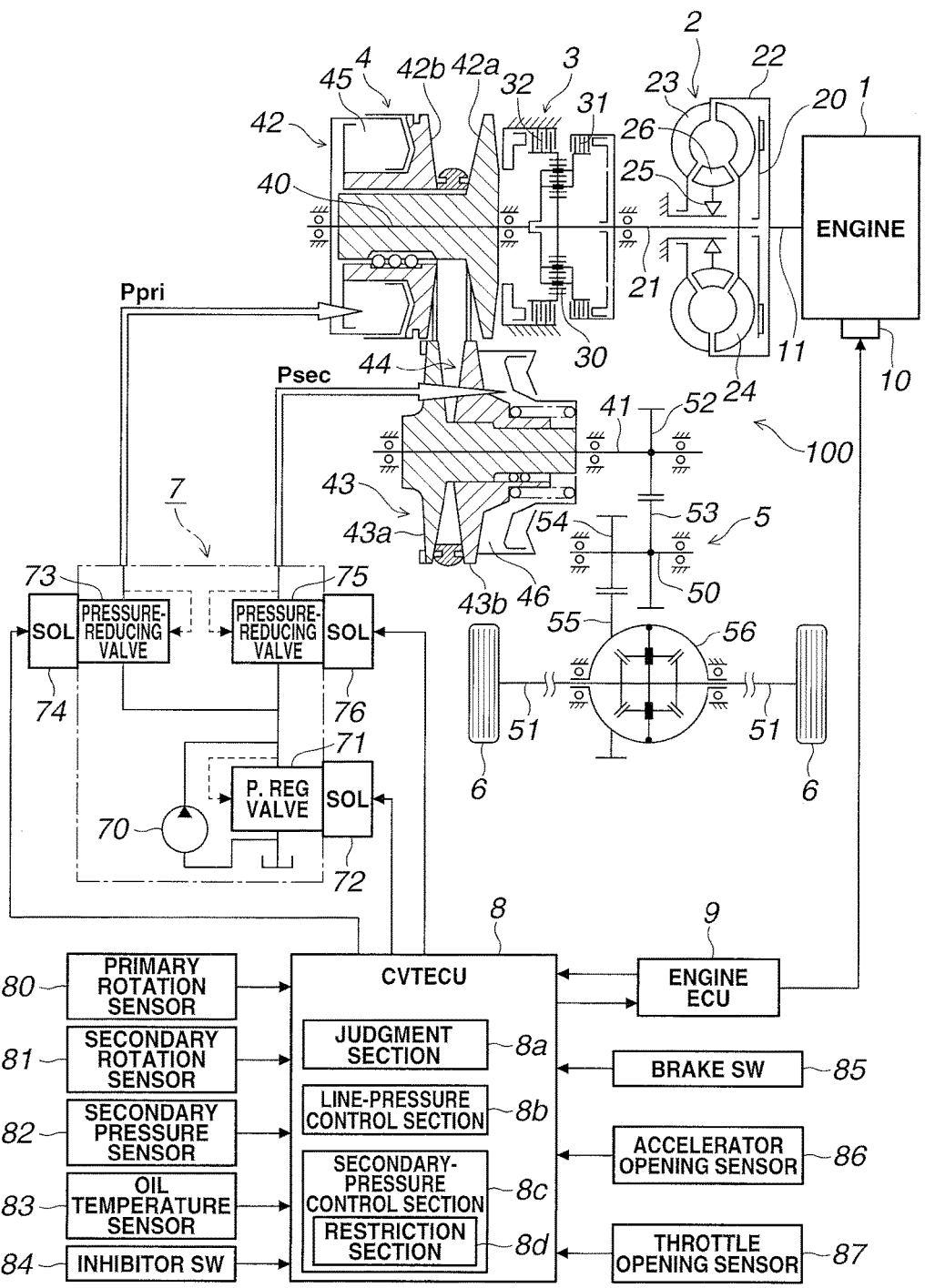
FIG. 1 An overall system diagram showing a drive system and a control system of an engine vehicle to which a control device for a continuously variable transmission in an embodiment according to the present invention has been applied.

Hereinafter, referring to the drawings, embodiments according to the present invention will be explained. It is noted that the following embodiments are just examples, and hence, various modifications and technical applications which are not clearly described in the following embodiments are not excluded from the present invention. Respective configurations in the following embodiments can be used by variously modifying the respective configurations within those ideas. Moreover, some of the respective configurations can be selected or properly combined as needed.

Moreover, in after-mentioned hydraulic controls, a line pressure, a primary pressure and a secondary pressure are controlled. Actual values of the line pressure, the primary pressure and the secondary pressure will be respectively referred to as an actual line pressure, an actual primary pressure and an actual secondary pressure. Among these actual pressures, the actual secondary pressure can be sensed by a sensor. Moreover, target values of the primary pressure and the secondary pressure will be respectively referred to as a target primary pressure and a target secondary pressure. Moreover, oil pressure values which are commands to bring the primary pressure and/or the secondary pressure to the target primary pressure and/or the target secondary pressure will be referred to as a command line pressure, a command primary pressure and a command secondary pressure.

[1. Overall System Configuration]

FIG. 1 is an overall system diagram showing a drive system and a control system of a vehicle to which a control device in an embodiment according to the present invention has been applied.

As shown in FIG. 1, the drive system of the vehicle includes an engine (internal combustion engine) 1 which is a drive source, a torque converter 2, a forward/reverse switching mechanism 3, a belt-type continuously-variable shift mechanism (belt-type continuously-variable transmitting mechanism) 4, a final reduction gear mechanism 5, and drive wheels 6 and 6. It is noted that a belt-type continuously variable transmission 100 (hereinafter referred to as "CVT 100") is constituted by accommodating the torque converter 2, the forward/reverse switching mechanism 3, the belt-type continuously-variable shift mechanism 4 and the final reduction gear mechanism 5 in a transmission case.

The engine 1 is equipped with an output-torque control actuator 10 that executes an output torque control by opening/closing operations of a throttle valve, a fuel cut operation and the like. Hence, the output torque of the engine 1 can be controlled by not only an accelerator manipulation of a driver but also an engine control signal derived from an outside.

The torque converter 2 is a movement-start element having a torque increasing function. The torque converter 2 includes a lockup clutch 20. The lockup clutch 20 can directly connect an engine output shaft 11 (=torque-converter input shaft) with an torque-converter output shaft 21 when the torque increasing function is not necessary. The torque converter 2 includes a pump impeller 23, a turbine runner 24 and a stator 26. The pump impeller 23 is connected through a converter housing 22 with the engine output shaft 11. The turbine runner 24 is connected with the torque-converter output shaft 21. The stator 26 is attached to the case through a one-way clutch 25.

The forward/reverse switching mechanism 3 is a mechanism for switching an input rotational direction of the belt-type continuously-variable shift mechanism 4 between a forward-rotational direction at the time of forward running and a reverse-rotational direction at the time of reverse running. The forward/reverse switching mechanism 3 includes a planetary gear mechanism 30, a forward clutch 31 and a reverse brake 32. The forward clutch 31 is constituted by a plurality of clutch plates, and the reverse brake 32 is constituted by a plurality of brake plates. The planetary gear mechanism 30 is, for example, a double-pinion-type planetary gear mechanism. A sun gear of the planetary gear mechanism 30 is connected with the torque-converter output shaft 21, and a carrier of the planetary gear mechanism 30 is connected with a transmission input shaft 40. At the time of forward running, the forward clutch 31 is engaged so that the sun gear and the carrier of the planetary gear mechanism 30 are directly connected with each other. At the time of reverse running, the reverse brake 32 is engaged so that a ring gear of the planetary gear mechanism 30 is fixed to the case.

The belt-type continuously-variable shift mechanism 4 has a continuously-variable shift function (stepless transmitting function) that continuously varies a speed ratio (=transmission-input rotational speed/transmission-output rotational speed) between an input rotational speed of the transmission input shaft 40 and an output rotational speed of a transmission output shaft 41 by means of variation of belt contact radius. The belt-type continuously-variable shift mechanism 4 includes a primary pulley 42, a secondary pulley 43 and a belt 44, and is controlled by pressures of working oil (ATF; Automatic Transmission Fluid).

The primary pulley 42 is constituted by a fixed pulley 42a and a slide pulley 42b. The slide pulley 42b slides in an axial direction by a primary pressure Ppri (also called "primary pulley pressure") introduced into a primary hydraulic chamber 45. The secondary pulley 43 is constituted by a fixed pulley 43a and a slide pulley 43b. The slide pulley 43b slides in the axial direction by a secondary pressure Psec (also called "secondary pulley pressure") introduced into a secondary hydraulic chamber 46.

Mutually opposed surfaces (sheave surfaces) of the fixed pulley 42a and the slide pulley 42b of the primary pulley 42 form a V-shape. In the same manner, mutually opposed surfaces (sheave surfaces) of the fixed pulley 43a and the slide pulley 43b of the secondary pulley 43 form a V-shape. Flank surfaces of the belt 44 which are located at both sides of the belt 44 are in contact with these sheave surfaces. That is, the belt 44 is wound around the V-shaped sheave surfaces of the primary pulley 42 and the V-shaped sheave surfaces of the secondary pulley 43 so as to connect the primary pulley 42 with the secondary pulley 43 therebetween. A winding radius of the belt 44 on the primary pulley 42 and a winding radius of the belt 44 on the secondary pulley 43 are varied according to movements of the slide pulley 42b and the slide pulley 43b. As a result, the speed ratio is varied.

The final reduction gear mechanism 5 reduces a transmission output rotational-speed derived from the transmission output shaft 41 of the belt-type continuously-variable shift mechanism 4, and applies a differential function to the reduced output rotational-speed so as to transfer this output rotational-speed to the left and right drive wheels 6 and 6. The final reduction gear mechanism 5 includes a first gear 52, a second gear 53, a third gear 54, a fourth gear 55 and a differential gear 56 which are interposed among the transmission output shaft 41, an idler shaft 50, and left and right drive shafts 51 and 51. The first gear 52, the second gear 53, the third gear 54 and the fourth gear 55 have a speed-reduction function. The differential gear 56 has the differential function.

As shown in FIG. 1, the control system of the vehicle, particularly a control system for the CVT 100 includes a shift hydraulic control unit 7 and a CVT electronic control unit 8 (hereinafter referred to as "CVTECU 8"). Moreover, the control system of the vehicle includes an engine control unit 9 (hereinafter referred to as "engine ECU 9") which sends and receives information to/from the CVTECU 8. It is noted that each of the electronic control units 8 and 9 includes input and output units, a storage unit (e.g. ROM, RAM), a central processing unit (CPU), a time counter (timer), and the like. A plurality of control programs have been stored in the storage unit.

The hydraulic control unit 7 produces the primary pressure Ppri that is introduced into the primary hydraulic chamber 45, and the secondary pressure Psec that is introduced into the secondary hydraulic chamber 46. The hydraulic control unit 7 includes an oil pump 70, a regulator valve 71, a line-pressure solenoid 72, a shift control valve 73, a primary-pressure pressure-reducing valve 73, a primary-pressure solenoid 74, a secondary-pressure pressure-reducing valve 75 and a secondary-pressure solenoid 76.

The regulator valve 71 regulates or adjusts the line pressure by using a discharge pressure of the oil pump 70 as a base pressure. The regulator valve 71 includes the line-pressure solenoid 72, and thereby adjusts a hydraulic pressure pumped by the oil pump 70 to a predetermined level of the line pressure according to a command derived from the CVT control unit 8.

The primary-pressure pressure-reducing valve 73 adjusts the primary pressure Ppri which is introduced into the primary hydraulic chamber 45, by using the line pressure produced by the regulator valve 71 as its base pressure. The pressure-reducing valve 73 includes the primary-pressure solenoid 74, and thereby produces a predetermined level of the primary pressure Ppri by reducing the line pressure in accordance with a command derived from the CVT control unit 8. The secondary-pressure pressure-reducing valve 75 adjusts the secondary pressure Psec which is introduced into the secondary hydraulic chamber 46, by using the line pressure produced by the regulator valve 71 as its base pressure. The pressure-reducing valve 75 includes the secondary-pressure solenoid 76, and thereby produces a predetermined level of the secondary pressure Psec by reducing the line pressure in accordance with a command derived from the CVT control unit 8.

The CVT control unit 8 is connected to various kinds of sensors such as a primary rotational-speed sensor 80, a secondary rotational-speed sensor 81, a secondary pressure sensor 82, an oil temperature sensor 83, an inhibitor switch 84, a brake switch 85 for the vehicle, an accelerator opening sensor 86 for the vehicle, and a throttle opening sensor 87 for the vehicle. Hence, the CVT control unit 8 receives these sensor information and switch information. The primary rotational-speed sensor 80 senses a rotational speed (i.e. number of revolutions per unit time) Npri of the primary pulley 42. The secondary rotational-speed sensor 81 senses a rotational speed (i.e. number of revolutions per unit time) Nsec of the secondary pulley 43. The secondary pressure sensor 82 senses the secondary pressure Psec. The oil temperature sensor 83 senses a temperature OT of the working oil. The inhibitor switch 84 detects a manipulated shift position. Moreover, the CVTECU 8 receives torque information derived from the engine ECU 9, and outputs a torque request to the engine ECU 9.

The CVTECU 8 performs a line pressure control, a secondary pressure control, a primary pressure control, a forward/reverse switching control, and the like. The line pressure control is performed such that a predetermined control command (command line pressure) is outputted to the line-pressure solenoid 72. The secondary pressure control is performed such that a control command (command secondary pressure Psec_co) for realizing a predetermined target secondary pressure Psec_tg is outputted to the secondary-pressure solenoid 76. The primary pressure control is performed such that a control command (command primary pressure Ppri_co) for realizing a predetermined target primary pressure Ppri_tg is outputted to the primary-pressure solenoid 75. The forward/reverse switching control is performed such that an engagement/release of the forward clutch 31 and an engagement/release of the reverse brake 32 are controlled. Among these controls, the line pressure control and the secondary pressure control will be explained in detail.

[2. Overview of Control]
[2-1. Line Pressure Control]

The line pressure control includes a normal line pressure control and a same-pressure control. The normal line pressure control is performed such that a control command for realizing a target line pressure PL_tg according to a throttle opening or the like is outputted to the line-pressure solenoid 72. The same-pressure control is performed in the case that a predetermined start condition is satisfied. The normal line pressure control is a conventional technique, and hence, the same-pressure control will now be explained in detail.

The same-pressure control is a control for reducing the line pressure PL to a necessary pulley pressure such that the line pressure PL becomes equal to the necessary pulley pressure. Thereby, the discharge pressure of the oil pump 70 is reduced with a friction reduction, resulting in an improvement of fuel economy. It is noted that the necessary pulley pressure is higher one of the primary pressure Ppri and the secondary pressure Psec (i.e. the primary pressure Ppri or the secondary pressure Psec, whichever is higher). That is, in the same-pressure control, the line pressure PL is reduced down to higher one of the primary pressure Ppri and the secondary pressure Psec, and hence the line pressure PL is introduced into the primary hydraulic chamber 45 or the secondary hydraulic chamber 46 as it is without a pressure adjustment of the pressure-reducing valve 73 or 75.

The same-pressure control in the case that the line pressure PL is made to become equal to the secondary pressure Psec will now be explained in detail. A predetermined start condition for starting this same-pressure control (same-pressure control with the secondary pressure) is satisfied, for example, when all of the following requirements (A) to (c) are satisfied.

(A) An operating region of the CVT 100 is within a low-vehicle-speed and high-rotational-speed region.

(B) The oil temperature OT is higher than or equal to a predetermined temperature $OT_\oslash$ ($OT \geq OT_\oslash$).

(C) The command secondary pressure Psec_co is higher than or equal to a predetermined value (Psec_co≥Predetermined value).

Figure 2:
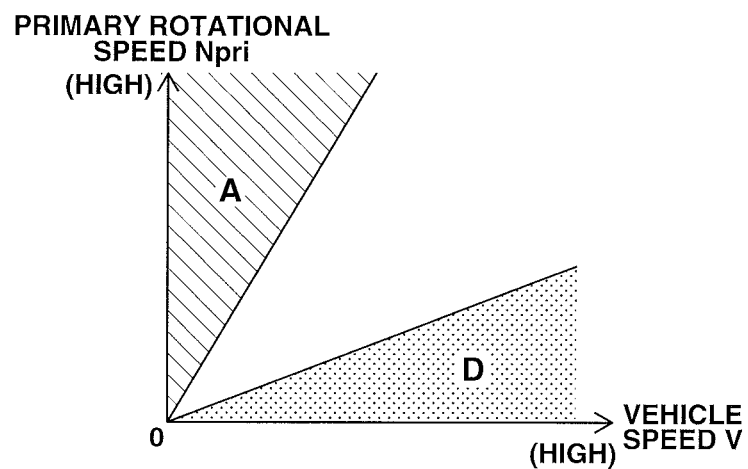
FIG. 2 One example of a map which is provided for judging a start condition.

It is judged whether or not the above requirement (A) is satisfied, by using a map as shown in FIG. 2. For example, this map is previously stored in the CVTECU 8. The primary rotational speed Npri sensed by the primary rotational-speed sensor 80 and a vehicle speed V calculated from the secondary rotational speed Nsec sensed by the secondary rotational-speed sensor 81 are applied to the map of FIG. 2. When an operating state given by the primary rotational speed Npri and the vehicle speed V falls within a region "A" shown by oblique lines, it is determined that the requirement (A) is satisfied. It is noted that because this region "A" has LOW-side values of the speed ratio, the secondary pressure Psec is higher than the primary pressure Ppri (Psec>Ppri) in the region "A". Therefore, the requirement (A) can be translated into "the secondary pressure Psec is higher than the primary pressure Ppri".

The above requirement (B) is given in order not to perform the same-pressure control when the oil temperature OT is low. The requirement (B) is judged by comparing the oil temperature OT sensed by the oil temperature sensor 83 with the predetermined temperature $OT_\oslash$ which is a judgment criteria temperature. The above requirement (C) is judged by comparing the command secondary pressure Psec_co of the after-mentioned secondary pressure control with the predetermined value which is a judgment criteria pressure. It is noted that each of this predetermined value and the predetermined temperature $OT_\oslash$ is previously set to have a sufficient level to perform the same-pressure control.

Figure 7:
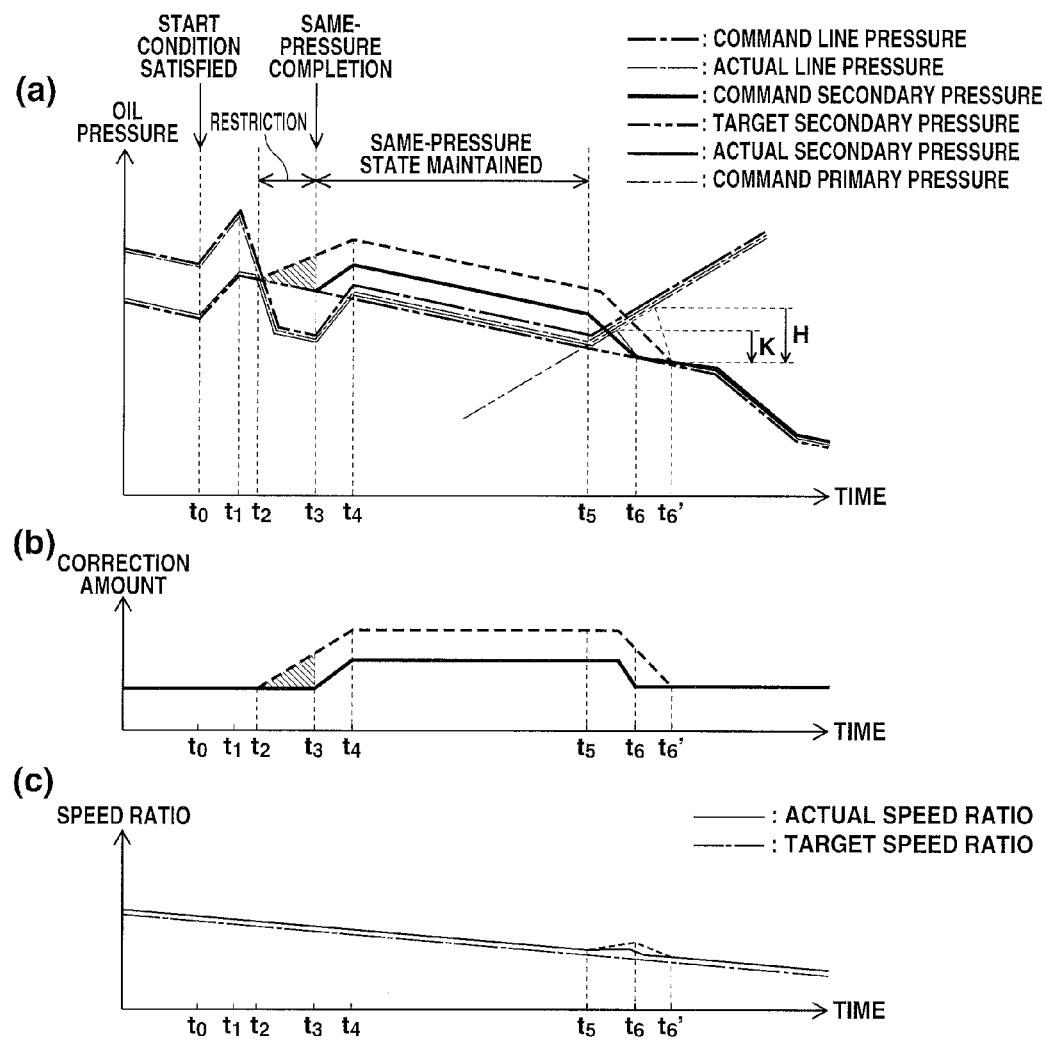
FIG. 7 Time charts showing schematic actions of a same-pressure control which is performed by the control device of FIG. 1.

Next, contents of the same-pressure control will be explained by using a time chart of FIG. 7(*a*). When it is determined that the above-mentioned start condition is satisfied (time point $t_0$), a same-pressure producing process for causing the line pressure PL to become equal to the actual secondary pressure Psec is started. Specifically, a command line pressure PL_co which is a control command for the line pressure PL is temporarily increased from time point $t_0$ at a predetermined gradient. Then, the command line pressure PL_co is gradually reduced at a predetermined gradient from time point $t_1$ so that the command line pressure PL_co is made to be lower than the target secondary pressure Psec_tg. Because the actual secondary pressure Psec cannot become higher than the actual line pressure PL, the actual secondary pressure Psec becomes lower than the target secondary pressure Psec_tg if the actual line pressure PL is made to be lower than the target secondary pressure Psec_tg.

That is, the actual secondary pressure Psec is pushed down (depressed) by the line pressure PL from time point $t_2$ at which the line pressure PL has just become lower than the target secondary pressure Psec_tg. Hence, a deviation is produced between the target secondary pressure Psec_tg and the actual secondary pressure Psec. Although the actual line pressure PL cannot be directly sensed, the actual secondary pressure Psec can be sensed by the secondary pressure sensor 82. Therefore, a magnitude of this deviation (i.e. a difference Δ Psec obtained by subtracting the actual secondary pressure Psec from the target secondary pressure Psec_tg) can be calculated. When this deviation magnitude has just become greater than or equal to a predetermined value Pc, it is determined that the actual line pressure PL has become equal to the actual secondary pressure Psec (time point $t_3$). At this time, the same-pressure producing process is ended.

It is noted that the predetermined value Pc is set, in advance, at a value (for example, a greater value than an amplitude of oil-pressure vibration) capable of determining that the actual secondary pressure Psec has deviated from the target secondary pressure Psec_tg. Hereinafter, this predetermined value Pc is referred to as "same-pressure determination value". Moreover, this determination is referred to as "same-pressure completion determination". Time point $t_3$ at which the same-pressure completion determination is done is referred to as "same-pressure completion time point". That is, the control for reducing the line pressure PL is ended at the same-pressure completion time point $t_3$.

After the start condition was satisfied and before the same-pressure producing process is started (i.e. before the reduction of the line pressure PL is started), the command secondary pressure Psec_co is increased by the after-mentioned secondary pressure control such that the actual secondary pressure Psec is increased by a predetermined pressure Pb. In other words, the same-pressure producing process is started after the command secondary pressure Psec_co was increased by the predetermined pressure Pb by the after-mentioned secondary pressure control.

After the same-pressure completion determination (i.e. after time point $t_3$), a hydraulic feedback correction amount FB calculated by a hydraulic feedback control of the after-mentioned secondary pressure control is reflected in the command line pressure PL_co. Accordingly, the actual line pressure PL (the actual secondary pressure Psec sensed by the secondary pressure sensor 82) is brought closer to the target secondary pressure Psec_tg while maintaining the same-pressure state between the actual line pressure PL and the actual secondary pressure Psec. The same-pressure state between the actual line pressure PL and the actual secondary pressure Psec is ended at a time point at which the command primary pressure Ppri_co has become higher than the actual secondary pressure Psec.

That is, the LOW-side speed ratio given when the above-mentioned start condition was satisfied varies (i.e. is upshifted) toward HIGH side, and thereby the command primary pressure Ppri_co exceeds the actual secondary pressure Psec at the time point ($t_5$). After time point $t_5$, the line pressure PL needs to be adjusted to higher one (i.e. the primary pressure) of the primary pressure Ppri and the secondary pressure Psec. Hence, the same-pressure state between the actual line pressure PL and the actual secondary pressure Psec is ended at time point $t_5$. In other words, a state where the command primary pressure Ppri_co is higher than or equal to the actual secondary pressure Psec (Command primary pressure Ppri_co≥Actual secondary pressure Psec) is a condition for terminating the same-pressure state between the actual line pressure PL and the actual secondary pressure Psec. After time point $t_5$, the line pressure PL is controlled such that the line pressure PL is equal to the primary pressure Ppri.

Moreover, the same-pressure control for causing the line pressure PL to be equal to the secondary pressure Psec (i.e. the same-pressure control with the secondary pressure) is ended, for example, when the following requirement (D) (i.e. end condition) is satisfied.

(D) The operating region is within a high-vehicle-speed and low-rotational-speed region.

For example, when the operating state falls within a region "D" shown by dots in the map of FIG. 2, it is determined that the requirement (D) is satisfied. If it is determined that the requirement for ending the same-pressure control with the secondary pressure is satisfied, a same-pressure control with the primary pressure Ppri or the normal line pressure control is performed.

[2-2. Secondary Pressure Control]

In the secondary pressure control, a command value (the command secondary pressure) which is outputted to the secondary-pressure solenoid 76 is calculated according to the deviation (the difference Δ Psec) of the actual secondary pressure Psec relative to the set target secondary pressure Psec_tg, and then, the actual secondary pressure Psec is made to be equal to the target secondary pressure Psec_tg. That is, in the secondary pressure control, the secondary pressure Psec is controlled by way of hydraulic feedback control, based on the difference Δ Psec between the actual secondary pressure Psec sensed by the secondary pressure sensor 82 and the target secondary pressure Psec_tg. It is noted that this hydraulic feedback control includes at least an integral action, e.g. is a PI control or a PID control.

Specifically, a transmission input torque is calculated based on the torque information (e.g. an engine rotational speed, a fuel injection time) derived from the engine ECU 9. From this transmission input torque, a belt clamping force (basic secondary thrust) necessary for the secondary pulley 43 is calculated. Next, a thrust difference (i.e. a difference in belt clamping force between the primary pulley 42 and the secondary pulley 43) necessary at the time of shift (speed-ratio change) is calculated. On the basis of this thrust difference, the basic secondary thrust is corrected. Then, the corrected secondary thrust is converted into the target secondary pressure Psec_tg, so that a normal target secondary pressure Psec_tgn is set. It is noted that the target secondary pressure Psec_tg set based on the transmission input torque or the like as just mentioned is referred to as "normal target secondary pressure Psec_tgn".

Moreover, the actual secondary pressure Psec is constantly sensed by the secondary pressure sensor 82. The difference Δ Psec is calculated by subtracting the actual secondary pressure Psec from the set target secondary pressure Psec_tg. Then, this difference Δ Psec is multiplied by a predetermined integration gain G. Then, the PI control or the PID control is applied to this multiplied value (G×Δ Psec), so that the hydraulic feedback correction amount FB (hereinafter simply referred to as "correction amount FB") is calculated. For purpose of simplification of explanations, only the integral action will be explained by omitting explanations about controls other than the integral action. That is, the correction amount FB is calculated by integrating (accumulating) the multiplied value.

A value (Psec_tg+FB) obtained by adding the correction amount FB to the target secondary pressure Psec_tg is set as the command secondary pressure Psec_co (control command). This command secondary pressure Psec_co is converted into an electric current value for solenoid. Then, this electric current value is outputted to the secondary-pressure solenoid 76 of the secondary-pressure pressure-reducing valve 75. It is noted that, during a time period ($t_3$ to $t_5$) for which the same-pressure state is maintained, the actual line pressure is lower than the command secondary pressure. Hence, during this time period, a pressure-adjustment function of the secondary-pressure pressure-reducing valve 75 is actually impracticable although electric current is supplied to the secondary-pressure solenoid 76.

In the secondary pressure control according to this embodiment, when it is determined that the above-mentioned predetermined start condition for the same-pressure control is satisfied, the target secondary pressure Psec_tg is set at a target secondary pressure Psec_tgs for the same-pressure control. This target secondary pressure Psec_tgs for the same-pressure control is higher by the predetermined pressure Pb than the normal target secondary pressure Psec_tgn. By this setting, the actual secondary pressure Psec rises. This setting is done in order to prevent a shortage of belt clamping force which is caused because the actual secondary pressure Psec is pushed down by the above-mentioned same-pressure producing process of the same-pressure control.

That is, the actual secondary pressure Psec is previously increased by an amount greater than or equal to an oil pressure amount (the same-pressure determination value Pc) by which the actual secondary pressure Psec is pushed down by the reduction of the actual line pressure PL. As a result, a belt slipping is suppressed. In other words, the predetermined pressure Pb is set at a value greater than or equal to the same-pressure determination value Pc by which the actual secondary pressure Psec is pushed down by the line pressure PL in the same-pressure control. In this example, the predetermined pressure Pb is equal to the same-pressure determination value Pc.

Figure 3:
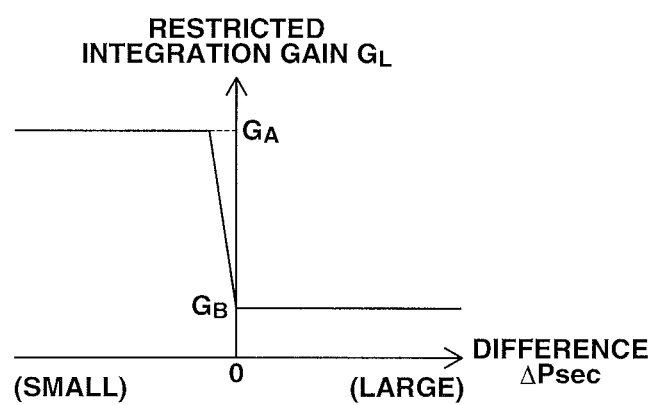
FIG. 3 One example of a map which is provided for setting an integration gain $G_L$ for restriction in accordance with a difference $\Delta$ Psec.

Moreover, in the secondary pressure control according to this embodiment, the integration gain G for the hydraulic feedback control takes a smaller value than an integration gain $G_N$ for a normal hydraulic feedback control, for a period ranging from the time point ($t_2$) at which the actual secondary pressure Psec starts to be pushed down by the above-mentioned same-pressure control to the same-pressure completion time point ($t_3$) at which the same-pressure completion determination is done. For example, for a period ranging from the time point ($t_0$) at which the above-mentioned start condition is satisfied to the same-pressure completion time point ($t_3$), an integration gain $G_L$ is obtained according to the difference Δ Psec by using a map as shown in FIG. 3. That is, when the above-mentioned start condition is satisfied (time point $t_0$), the integration gain $G_N$ for the normal hydraulic feedback control is changed into the integration gain $G_L$ according to the difference Δ Psec (i.e. restricted or suppressed integration gain $G_L$). It is noted that the normal integration gain $G_N$ and the map of FIG. 3 have been stored in the CVTECU 8 in advance.

In the map of FIG. 3, in a region in which the difference Δ Psec is large, the integration gain $G_L$ is set at a smaller level than that in a region in which the difference Δ Psec is small. Specifically, in a region over which the difference Δ Psec is greater than or equal to 0 (i.e. Psec_tg≥Psec), the integration gain $G_L$ is set at a constant minute value $G_B$. In a region over which the difference Δ Psec is smaller than 0 (i.e. Psec_tg<Psec) and near 0, the integration gain $G_L$ is set such that the integration gain $G_L$ increases more from the minute value $G_B$ at a predetermined gradient toward a value $G_A$ as the difference Δ Psec becomes smaller. The value $G_A$ is larger than the minute value $G_B$. In a region over which the difference Δ Psec is smaller than 0 and not near 0, the integration gain $G_L$ is set at the constant value $G_A$ larger than the integration gain $G_B$. In this example, the integration gain $G_B$ is set at 0, and the integration gain $G_A$ is set at a level equal to the integration gain $G_N$ for the normal hydraulic feedback control. ($G_N = G_A > G_B = 0$)

That is, in the secondary pressure control according to this embodiment, the integration gain $G_L$ is given by the map of FIG. 3 from the time point ($t_0$) at which it is determined that the above-mentioned start condition of the same-pressure control is satisfied. However, the integration gain $G_A$ equal to the integration gain $G_N$ for the normal hydraulic feedback control is used until the time point ($t_2$) at which the actual secondary pressure Psec starts to be pushed down by the same-pressure control. Then, during the period ($t_2$~$t_3$) over which the same-pressure state is in process of being produced by the push-down of the actual secondary pressure, the integration gain $G_B$ is used. Hence, the correction amount FB is calculated by integrating a value obtained by multiplying the difference Δ Psec by this integration gain $G_B$.

During the period ($t_2$~$t_3$) over which the same-pressure state is in process of being produced by the push-down of the actual secondary pressure, the integration gain $G_L$ is set at the value (integration gain $G_B$) smaller than the integration gain $G_N$ for the normal hydraulic feedback control. Hence, an accumulation of integral term of the hydraulic feedback control is limited, so that an increase of the correction amount FB is suppressed. That is, for this period ($t_2$~$t_3$), the actual secondary pressure Psec is always pushed down by the actual line pressure PL. Hence, even if the command secondary pressure Psec_co is increased to a great extent, the actual secondary pressure Psec cannot become higher than the actual line pressure PL. Therefore, for this period ($t_2$~$t_3$), the accumulation of integral term of the hydraulic feedback control is restricted so that unnecessary increase of the correction amount FB is suppressed.

From the same-pressure completion time point ($t_3$), the integration gain $G_N$ for the normal hydraulic feedback control is used. That is, the correction amount FB is calculated by integrating a value obtained by multiplying the difference Δ Psec by the integration gain $G_N$. Then, this correction amount FB is added to the target secondary pressure Psec_tg, and thereby the command secondary pressure Psec_co is set.

[3. Control Configuration]

As shown in FIG. 1, as elements for performing the above-mentioned line pressure control and the secondary pressure control, the CVTECU 8 includes a judgment section 8a, a line-pressure control section 8b and a secondary-pressure control section 8c. Moreover, the secondary-pressure control section 8c includes a restriction section 8d. Each of these elements may be realized by an electronic circuit (hardware), or may be a software program. Alternatively, a part of function of each element may be provided as a hardware whereas another part of the function is provided as software. These elements transmit/receive information to/from each other.

The judgment section (judging means) 8a judges the above-mentioned start condition of the same-pressure control for attaining the same-pressure state between the line pressure PL and the actual secondary pressure Psec, and judges whether or not the line pressure PL is equal to the actual secondary pressure Psec (i.e. whether the same-pressure completion or not), by use of information derived from the various sensors and the secondary-pressure control section 8c. Moreover, by use of these information, the judgment section 8a judges the end condition of the same-pressure control. The judgment section 8a transmits respective judgment results to the line-pressure control section 8b and the secondary-pressure control section 8c.

At first, the judgment section 8a judges whether or not the start condition of the same-pressure control is satisfied. In this example, the judgment section 8a judges whether or not the above-mentioned requirements (A) to (c) are all satisfied. Specifically, the judgment section 8a determines that the requirement (A) is satisfied if a current operating state falls within the region "A" by applying the primary rotational speed Npri sensed by the primary rotational-speed sensor 80 and the vehicle speed V calculated from the secondary rotational speed Nsec sensed by the secondary rotational-speed sensor 81 to the map of FIG. 2. On the other hand, if the current operating state does not fall within the region "A", the judgment section 8a determines that the requirement (A) is not satisfied.

Moreover, the judgment section 8a judges whether or not the requirement (B) is satisfied, from the oil temperature OT sensed by the oil temperature sensor 83. Moreover, the judgment section 8a judges whether or not the requirement (C) is satisfied, from the command secondary pressure Psec_co set by the secondary-pressure control section 8c. Then, the judgment section 8a determines that the start condition of the same-pressure control with the secondary pressure is satisfied if the requirements (A) to (c) are all satisfied. That is, the judgment section 8a determines that the start condition is not satisfied if any one of the requirements (A) to (c) is not satisfied.

The judgment section 8a continues to judge whether or not the start condition is satisfied, until the judgment section 8a determines that the start condition is satisfied. After the judgment section 8a determines that the start condition is satisfied, next, the judgment section 8a judges whether or not the same pressure has been completed. Specifically, the judgment section 8a subtracts the actual secondary pressure Psec sensed by the secondary pressure sensor 82 from the target secondary pressure Psec_tg set by the after-mentioned secondary-pressure control section 8c. Then, when this subtracted value (i.e. the difference $\Delta$ Psec) is greater than or equal to the same-pressure determination value Pc, the judgment section 8a determines that the same pressure has been completed. On the other hand, when the difference $\Delta$ Psec is smaller than the same-pressure determination value Pc, the judgment section 8a determines that the same-pressure state has not yet been realized (i.e. the same pressure has not yet been completed). It is noted that the difference $\Delta$ Psec may be obtained from the secondary-pressure control section 8c because the secondary-pressure control section 8c always continues to calculate the difference $\Delta$ Psec as mentioned later.

The judgment section 8a continues to judge whether or not the same pressure has been completed, until the judgment section 8a determines that the same pressure has been completed. After the judgment section 8a determines that the same pressure has been completed, next, the judgment section 8a judges whether or not the end condition of the same-pressure control with the secondary pressure is satisfied. Specifically, in the same manner as the judgment of the requirement (A), the judgment section 8a determines that the end condition is satisfied if the current operating state falls within the region "D" by applying the primary rotational speed Npri and the vehicle speed V to the map of FIG. 2. On the other hand, if the current operating state does not fall within the region "D", the judgment section 8a determines that the end condition is not satisfied. The judgment section 8a continues to judge whether or not the end condition is satisfied, until the judgment section 8a determines that the end condition is satisfied. After the judgment section 8a determines that the end condition is satisfied, next, the judgment section 8a again judges whether or not the start condition of the same-pressure control is satisfied.

The line-pressure control section (line-pressure control means) 8b performs the above-mentioned line pressure control by using the judgment result (information) of the judgment section 8a and information derived from the various sensors and the secondary-pressure control section 8c. That is, the line-pressure control section 8b performs the same-pressure control (the same-pressure control with the secondary pressure) for realizing the same-pressure state between the line pressure PL and the actual secondary pressure Psec, if the line-pressure control section 8b receives information that the start condition of the same-pressure control is satisfied, from the judgment section 8a. On the other hand, if the line-pressure control section 8b receives information that the start condition of the same-pressure control is not satisfied, the line-pressure control section 8b performs the normal line pressure control or the same-pressure control with the primary pressure.

When the line-pressure control section 8b receives the information that the start condition is satisfied from the judgment section 8a, the line-pressure control section 8b memorizes a current value of the actual secondary pressure Psec as an initial secondary pressure Psec_pr, and increases the command line pressure PL_co at the predetermined gradient in the same manner as an after-mentioned pressure-increase control of the secondary pressure. Then, when the actual secondary pressure Psec reaches a value (Psec_pr+Pb) given by adding the predetermined pressure Pb of the pressure-increase control to the initial secondary pressure Psec_pr as a result of the pressure-increase control of the secondary pressure, i.e. when a relation of (Psec≥Psec_pr+Pb) is established, the line-pressure control section 8b reduces the command line pressure PL_co at the predetermined gradient.

The line-pressure control section 8b continues to reduce the command line pressure PL_co until the line-pressure control section 8b receives information of the same-pressure completion from the judgment section 8a. When the same pressure is completed, the line-pressure control section 8b terminates the reduction of the command line pressure PL_co. Next, the line-pressure control section 8b reflects the correction amount FB calculated by the secondary-pressure control section 8c in the command line pressure PL_co (i.e. adds the correction amount FB to the command line pressure PL_co) in order to maintain the same-pressure state between the actual line pressure PL and the actual secondary pressure Psec. Then, the line-pressure control section 8b converts the command line pressure PL_co corrected by the correction amount FB into an electric-current value for solenoid, and outputs the electric-current value to the line-pressure solenoid 72 of the regulator valve 71.

The line-pressure control section 8b ends the same-pressure control for realizing the same-pressure state between the actual line pressure PL and the actual secondary pressure Psec, when the command primary pressure Ppri_co exceeds the actual secondary pressure Psec (i.e. Ppri_co ≥Psec) before the line-pressure control section 8b receives the information that the end condition is satisfied from the judgment section 8a. At this time, the line-pressure control section 8b performs a control for causing the line pressure PL and the primary pressure Ppri to be equal to each other (i.e. performs the same-pressure control with the primary pressure). In the case that the line-pressure control section 8b receives the information that the end condition of the same-pressure control with the secondary pressure is satisfied from the judgment section 8a, the line-pressure control section 8b terminates the currently-running same-pressure control, and instead may perform the normal line pressure control.

The secondary-pressure control section (secondary-pressure control means) 8c is configured to perform the above-mentioned secondary pressure control by using the judgment results (information) of the judgment section 8a and the information derived from the various sensors. That is, the secondary-pressure control section 8c calculates the difference Δ Psec by subtracting the actual secondary pressure Psec sensed by the secondary pressure sensor 82 from the set target secondary pressure Psec_tg. Then, the secondary-pressure control section 8c multiplies the difference Δ Psec by the predetermined integration gain G, and integrates (accumulates) this multiplied value. Then, the secondary-pressure control section 8c regards this integrated value as the correction amount FB. Accordingly, the secondary-pressure control section 8c sets a value obtained by adding the correction amount FB to the set target secondary pressure Psec_tg, as the command secondary pressure Psec_co.

According to this embodiment, in the case that the secondary-pressure control section 8c receives the information that the start condition of the same-pressure control is satisfied from the judgment section 8a, the secondary-pressure control section 8c switches the target secondary pressure Psec_tg from the normal target secondary pressure Psec_tgn to the target secondary pressure Psec_tgs for the same-pressure control, ahead of the same-pressure control. Thereby, the secondary-pressure control section 8c performs the pressure-increase control of the secondary pressure. That is, when the secondary-pressure control section 8c receives the information that the start condition is satisfied from the judgment section 8a, the secondary-pressure control section 8c sets a value obtained by adding the predetermined pressure Pb to the normal target secondary pressure Psec_tgn, as an updated value of the target secondary pressure Psec_tg (i.e. the target secondary pressure Psec_tgs for the same-pressure control), so that the secondary pressure is controllably increased. The secondary-pressure control section 8c causes the actual secondary pressure Psec to become equal to the target secondary pressure Psec_tgs for the same-pressure control by way of hydraulic feedback control.

The restriction section 8d provided in the secondary-pressure control section 8c restricts or limits the accumulation of integral term of the integral action, for a period ranging from the time point at which the actual secondary pressure Psec starts to be pushed down by the line-pressure control section 8b to the time point at which the actual line pressure PL and the actual secondary pressure Psec have become equal to each other. Specifically, from a time point at which the restriction section 8d receives the information that the start condition is satisfied from the judgment section 8a, the restriction section 8d switches the integration gain G provided for calculating the correction amount FB, from the normal integration gain $G_N$ to the integration gain $G_L$ for restriction.

That is, the restriction section 8d applies the calculated difference Δ Psec to the map of FIG. 3, and thereby obtains the integration gain $G_L$ according to the difference Δ Psec. Then, the restriction section 8d multiplies the obtained integration gain $G_L$ by the difference Δ Psec, and integrates this multiplied value to calculate the correction amount FB. Hence, during a period over which the actual secondary pressure Psec increases because the actual secondary pressure Psec is pushed down by the actual line pressure PL, the integration gain $G_L$ takes a smaller value as the difference Δ Psec becomes larger. Therefore, during this period, the accumulation of the correction amount FB is restricted. In particular, in the case that the integration gain $G_L$ is set at 0, the value obtained by multiplying the difference Δ Psec by 0 is equal to 0. In this case, the accumulation of the correction amount FB can be stopped temporarily.

The restriction section 8d continues to restrict (limit) the accumulation of integral term until the secondary-pressure control section 8c receives the information that the same pressure has been completed from the judgment section 8a. When the same pressure is completed, the secondary-pressure control section 8c resets the integration gain G to the normal integration gain $G_N$. That is, after the same-pressure completion determination, the secondary-pressure control section 8c calculates the correction amount FB by using the normal integration gain $G_N$, and calculates the command secondary pressure Psec_co by adding the correction amount FB to the target secondary pressure Psec_tg (i.e. to the target secondary pressure Psec_tgs for the same-pressure control).

Then, the secondary-pressure control section 8c converts the calculated command secondary pressure Psec_co into an electric-current value for the solenoid, and outputs the electric-current value to the secondary-pressure solenoid 76 of the secondary-pressure pressure-reducing valve 75. In the case that the secondary-pressure control section 8c receives the information that the end condition of the same-pressure control with the secondary pressure is satisfied from the judgment section 8a, the secondary-pressure control section 8c resets the target secondary pressure Psec_tg to the normal target secondary pressure Psec_tgn. Then, the secondary-pressure control section 8c controls the secondary pressure Psec by setting the command secondary pressure Psec_co by way of the above-mentioned hydraulic feedback control.

[4. Flowchart]

Figure 4:
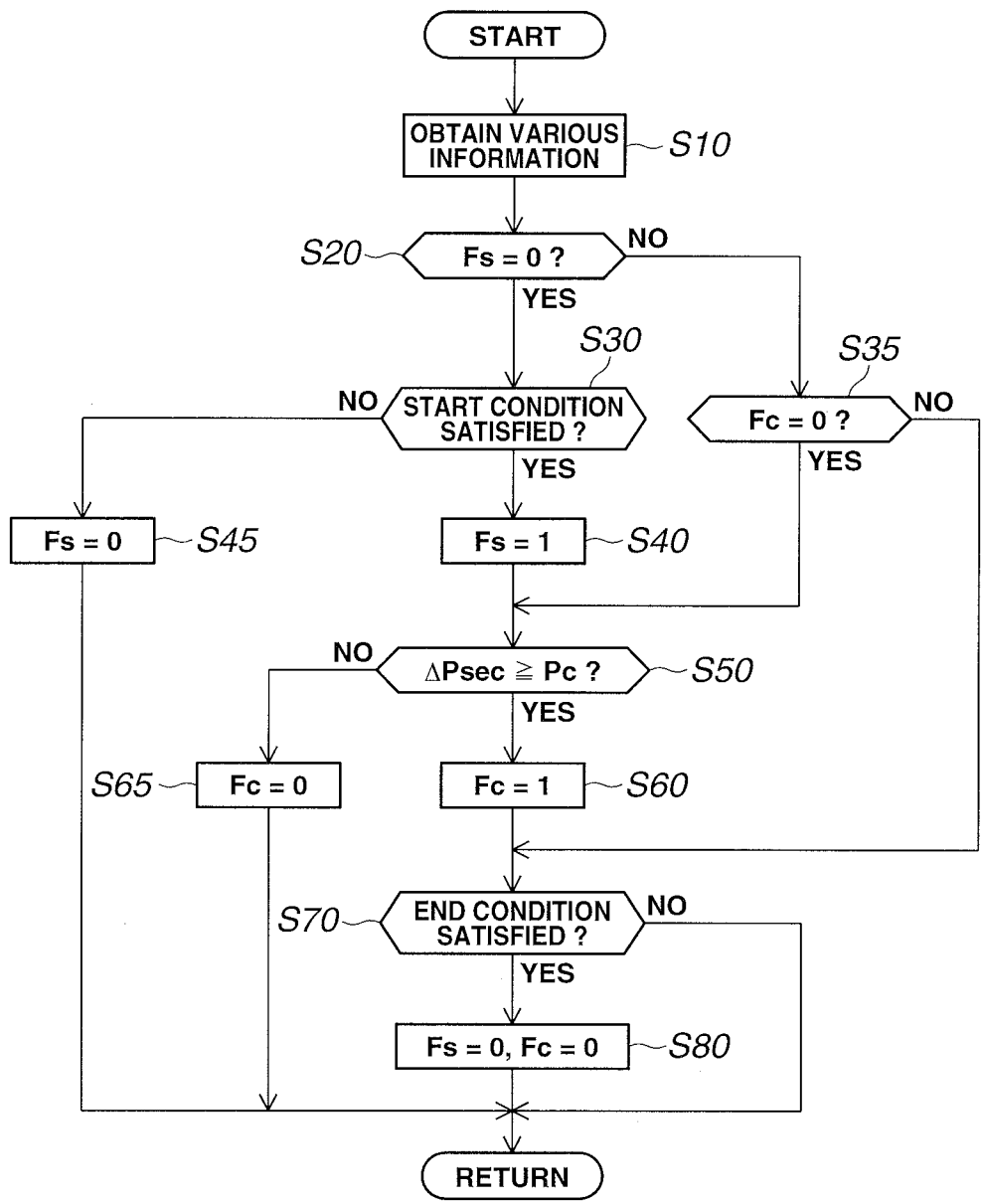
FIG. 4 One example of a flowchart which is executed in a judgment section of the control device of FIG. 1.
Figure 5:
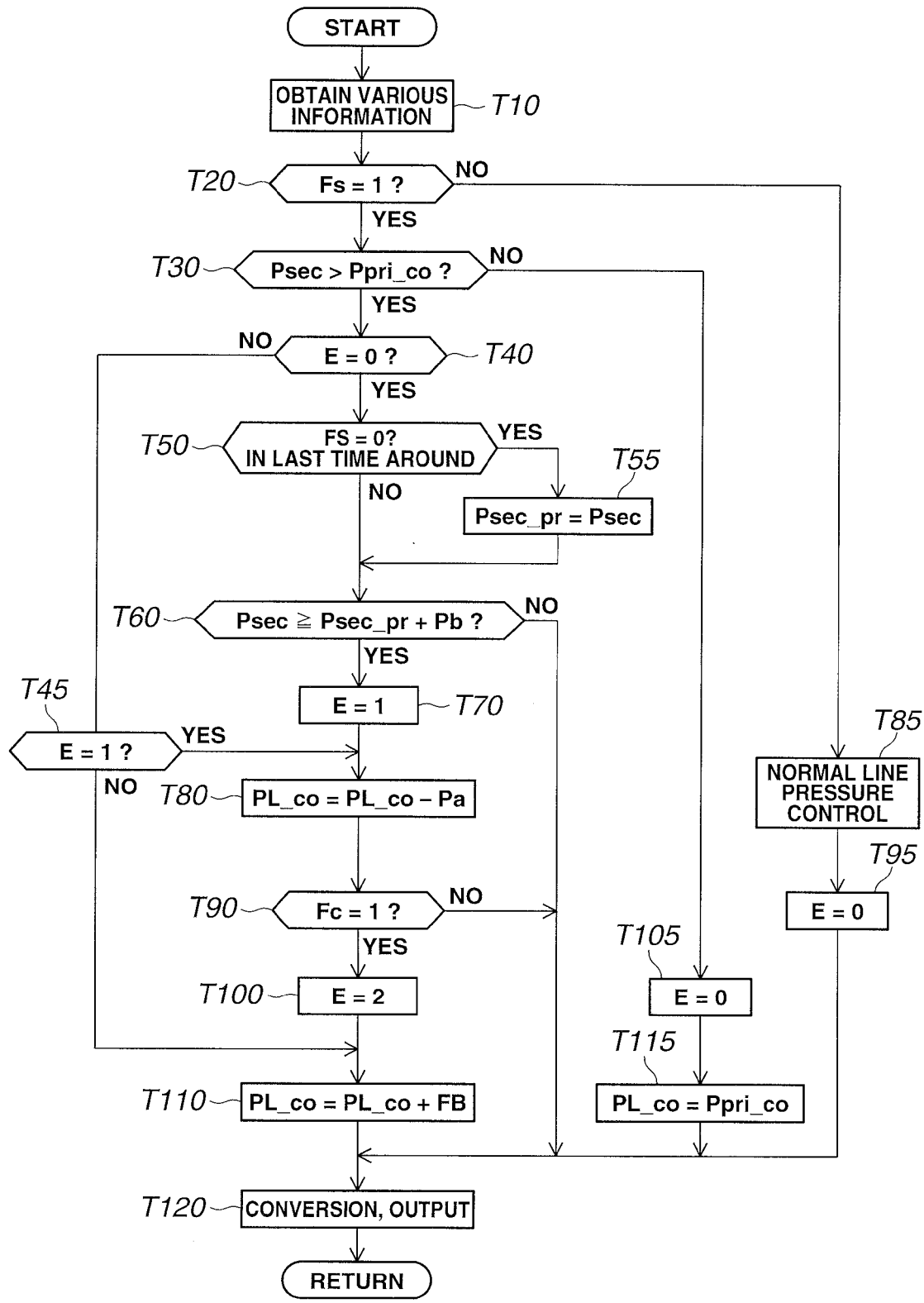
FIG. 5 One example of a flowchart which is executed in a line-pressure control section of the control device of FIG. 1.
Figure 6:
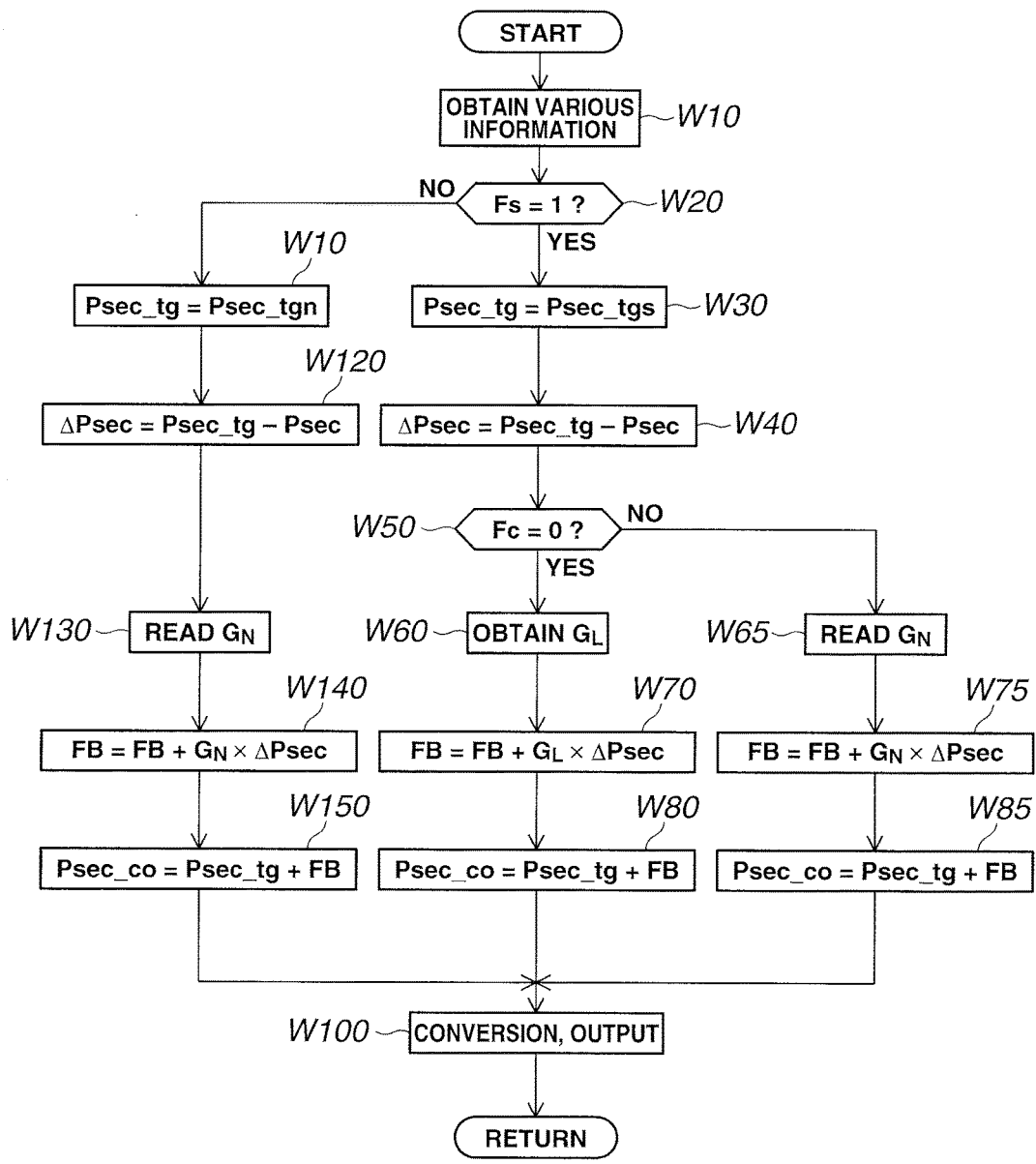
FIG. 6 One example of a flowchart which is executed in a secondary-pressure control section of the control device of FIG. 1.

Next, referring to FIGS. 4 to 6, a control procedure which is executed in the CVTECU 8 will now be explained as one example. FIGS. 4 to 6 show flowcharts which are executed respectively by the judgment section 8a, the line-pressure control section 8b and the secondary-pressure control section 8c. These flowcharts are executed in parallel repeatedly at a predetermined interval. Information such as flags and values which are set or computed in the respective flowcharts are transmitted to each other among the judgment section 8a, the line-pressure control section 8b and the secondary-pressure control section 8c.

The flowchart which is executed in the judgment section 8a will be explained at first. As shown in FIG. 4, at step S10, the sensor and switch information inputted into the CVTECU 8 are obtained, and the information derived from the secondary-pressure control section 8c is obtained. At step S20, it is judged whether or not a flag Fs is in the status of 0 (Fs=0). The flag Fs is a variable provided for checking whether or not the start condition of the same-pressure control for causing the line pressure PL and the secondary pressure Psec to become equal to each other is satisfied. The status [Fs=1] corresponds to the satisfaction of the start condition whereas the status [Fs=0] corresponds to the unsatisfaction of the start condition.

When the flag Fs is in the status of 0 (Fs=0), the program proceeds to step S30. At step S30, it is judged whether or not the start condition is satisfied based on the various information obtained at step S10. If the start condition is satisfied, the flag Fs is set at 1 (Fs=1) at step S40. Then, the program proceeds to step S50. On the other hand, if the start condition is not satisfied, the flag Fs is set at 0 (Fs=0) at step S45. Then, this flowchart is returned.

At step S50, it is judged whether or not the difference Δ Psec is greater than or equal to the same-pressure determination value Pc. This difference Δ Psec may be calculated by using the information (the target secondary pressure Psec_tg and the actual secondary pressure Psec) obtained at step S10. Alternatively, the difference Δ Psec calculated in the flowchart of FIG. 7 that is executed by the secondary-pressure control section 8c may be obtained at step S10.

If the difference Δ Psec is smaller than the same-pressure determination value Pc, the program proceeds to step S65. At step S65, a flag Fc is set at 0 (Fc=0). Then, the flowchart is returned. The flag Fc is a variable provided for checking whether or not the same pressure has been completed. The status [Fc=1] corresponds to the completion determination of the same pressure whereas the status [Fc=0] corresponds to an incompletion of the same pressure. In the next routine, the program proceeds from step S20 to step S35 because the flag Fs is in the status of 1 (Fs=1). Then, the judgment of step S50 is conducted again because the flag Fc is in the status of 0 (Fc=0). That is, these steps are repeated until the difference Δ Psec becomes greater than or equal to the same-pressure determination value Pc.

If the difference Δ Psec becomes greater than or equal to the same-pressure determination value Pc, the program proceeds from the step S50 to step S60. At step S60, the flag Fc is set at 1 (Fc=1). At subsequent step S70, it is judged whether or not the end condition is satisfied. If the end condition is not satisfied, this flowchart is returned so that the processing is started again from step S10. In this next routine, the program proceeds from step S20 to step S35. Then, the program proceeds to step S70 because the flag Fc is in the status of 1 (Fc=1). At step S70, it is judged whether or not the end condition is satisfied. That is, these steps are repeated until it is determined that the end condition is satisfied. If it is determined that the end condition is satisfied at step S70, each of the flags Fs and Fc is reset at 0 at step S80. Then, this flowchart is returned.

Next, the flowchart which is executed in the line-pressure control section 8b will now be explained. As shown in FIG. 5, at step T10, the sensor and switch information inputted into the CVTECU 8 are obtained, and also the information derived from the judgment section 8a and the secondary-pressure control section 8c is obtained. At step T20, it is judged whether or not the flag Fs is in the status of 1 (Fs=1). If the flag Fs is not in the status of 1 in the flowchart of FIG. 4 (i.e. if the start condition is not satisfied), the program proceeds to step T85. At step T85, the normal line pressure control is performed. At step T95, a flag E is set at 0 (E=0). Then, this flowchart is returned.

On the other hand, if the flag Fs is in the status of 1 (Fs=1) at step T20, the program proceeds to step T30. At step T30, it is judged whether or not the actual secondary pressure Psec is higher than the command primary pressure Ppri_co. Normally, the actual secondary pressure Psec is higher than the command primary pressure Ppri_co immediately after the flag Fs becomes in the status of 1 (Fs=1). Hence, at subsequent step T40, it is judged whether or not the flag E is in the status of 0 (E=0).

The flag E is a variable provided for grasping a control state of the line pressure PL. The status [E=0] corresponds to a state before the same-pressure producing process for causing the actual line pressure PL and the actual secondary pressure Psec to become equal to each other is started, or a state after the same-pressure state between the actual line pressure PL and the actual secondary pressure Psec is ended. The status [E=1] corresponds to a state where the same-pressure producing process is in execution. The status [E=2] corresponds to a state where the same-pressure state between the actual line pressure PL and the actual secondary pressure Psec is maintained.

When this flowchart starts, the program proceeds to step T50 because the flag E is in the status of 0 (E=0). At step T50, it is judged whether or not the flag Fs was in the status of 0 (Fs=0) in a last-time routine period. That is, if the flag Fs is set at 1 (Fs=1) for the first time in a current control routine period, a value of the actual secondary pressure Psec obtained at step T10 in the current control routine period is memorized as the initial secondary pressure Psec_pr at step T55.

At step T60, it is judged whether or not the actual secondary pressure Psec is larger than or equal to a value given by adding the predetermined pressure Pb to the initial secondary pressure Psec_pr memorized at step T55. After the start condition of the same-pressure control is satisfied to set the flag Fs at 1 (Fs=1), the sum of the predetermined pressure Pb and the normal target secondary pressure Psec_tgn is set as the target secondary pressure Psec_tgs for the same-pressure control such that the secondary pressure Psec is increased before the same-pressure control is started. Therefore, when this pressure-increase control of the secondary pressure is completed, the actual secondary pressure Psec becomes greater than or equal to the sum of the predetermined pressure Pb and the initial secondary pressure Psec_pr.

In the control routine period in which the initial secondary pressure Psec_pr is memorized, the relation of step T60 is not established as a matter of course. Hence, in this period, the flowchart is returned. In the next routine period, the various information is obtained again at step T10. These steps are repeated until the actual secondary pressure Psec becomes greater than or equal to the sum of the predetermined pressure Pb and the initial secondary pressure Psec_pr at step T60.

If the actual secondary pressure Psec becomes greater than or equal to the sum of the predetermined pressure Pb and the initial secondary pressure Psec_pr at step T60, the flag E is set at 1 (E=1) at step T70. At subsequent step T80, a value given by subtracting a predetermined value Pa from the command line pressure PL_co is set as an updated command line pressure PL_co. The value Pa used for this subtraction corresponds to a predetermined gradient at which the command line pressure PL_co is reduced. That is, the value Pa has been preset based on the predetermined gradient and the control routine period.

At step T90, it is judged whether or not the flag Fc is in the status of 1 (Fc=1). If the flag Fc is not in the status of 1 in the flowchart of FIG. 4 (i.e. if the same pressure has not yet been completed), the program proceeds to step T120. At step T120, the command line pressure PL_co set at step T80 is converted into an electric-current value for solenoid, and this electric-current value is outputted to the line-pressure solenoid 72 of the regulator valve 71. Then, this flowchart is returned.

In the next routine period, the program proceeds from step T40 to step T45 because the flag E is in the status of 1 (E=1). At step T45, it is judged whether or not the flag E is in the status of 1 (E=1). Hence, the program proceeds to step T80. At step T80, a value given by subtracting the value Pa from the last-time value of the command line pressure PL_co is set as the updated command line pressure PL_co. Then, the judgment of step T90 is conducted again. That is, the command line pressure PL_co is reduced at the predetermined gradient until the same-pressure completion is determined so that the flag Fc is set at 1 (Fc=1) in the flowchart of FIG. 4.

If the flag Fc is set at 1 (Fc=1), i.e. if the same pressure has been completed, the program proceeds from the step T90 to step T100, so that the flag E is set at 2 (E=2). At subsequent step T110, a value given by adding the correction amount FB to the command line pressure PL_co is set as the updated command line pressure PL_co. At step T120, this command line pressure PL_co is converted into an electric-current value, and this electric-current value is outputted to the line-pressure solenoid 72. Then, the flowchart is returned.

The correction amount FB which is added at step T110 is calculated by the secondary-pressure control section 8c as mentioned later. Because this correction amount FB is reflected in the command line pressure PL_co, the same-pressure state between the actual line pressure PL and the actual secondary pressure Psec is maintained. In the next routine period, the program proceeds through step T40 and step T45 to step T110 because the flag E is in the status of 2 (E=2). Hence, a value given by reflecting the correction amount FB in the command line pressure PL_co is outputted (at step T120).

If the speed ratio changes toward the HIGH side during execution of such a line pressure control such that a magnitude relation between the actual secondary pressure Psec and the command primary pressure Ppri_co is inverted (i.e. at the time of establishment of Psec≤Ppri_co), the program proceeds from the step T30 to step T105. At step T105, the flag E is reset to 0 (E=0). At subsequent T115, the command line pressure PL_co is set at the command primary pressure Ppri_co (i.e. to be equal to the command primary pressure Ppri_co). Then, at step T120, this command line pressure PL_co is converted into an electric-current value, and this electric-current value is outputted. Then, the flowchart is returned. It is noted that, when the end condition of the same-pressure control is satisfied, the program proceeds from step T20 to step T85 because the flag Fs is set at 0 (Fs=0) in the flowchart of FIG. 4. At step T85, the normal line pressure control is performed.

Finally, the flowchart which is executed in the secondary-pressure control section 8c will now be explained. As shown in FIG. 6, at step W10, the sensor and switch information inputted into the CVTECU 8 are obtained, and the information derived from the judgment section 8a and the line-pressure control section 8b is obtained. At step W20, it is judged whether or not the flag Fs is in the status of 1 (Fs=1). If the flag Fs is in the status of 1 in the flowchart of FIG. 4, the start condition of the same-pressure control has been satisfied. Hence, at step W30, the target secondary pressure Psec_tgs for the same-pressure control is set as the target secondary pressure Psec_tg.

At subsequent step W40, the difference Δ Psec is calculated from the actual secondary pressure Psec obtained at step W10 and the target secondary pressure Psec_tg set at step W30. At step W50, it is judged whether or not the flag Fc is in the status of 0 (Fc=0). If the same-pressure completion determination has not yet been done, the flag Fc is in the status of 0 (Fc=0). Hence, in this case, the program proceeds to step W60. At step W60, the integration gain $G_L$ for restriction is obtained according to the difference Δ Psec calculated at step W40.

At step W70, a value given by multiplying the difference Δ Psec by the integration gain $G_L$ obtained at step W60 is added to the last-time value of the correction amount FB, and this addition result is set as the updated correction amount FB. At step W80, a value given by adding the correction amount FB calculated at step W70 to the target secondary pressure Psec_tg set at step W30 is set as the command secondary pressure Psec_co. At step W100, this command secondary pressure Psec_co is converted into an electric-current value for solenoid, and this electric-current value is outputted to the secondary-pressure solenoid 76 of the secondary-pressure pressure-reducing valve 75. Then, this flowchart is returned.

If the flag Fs is in the status of 1 (Fs=1) and the flag Fc is in the status of 0 (Fc=0) in the next routine period or later, the above-mentioned processing from step W60 is repeated. Hence, for a time period from the time point at which the start condition of the same-pressure control becomes satisfied to the time point at which the same-pressure completion determination is done, the integration gain $G_L$ for restriction is obtained according to the difference Δ Psec. Therefore, the accumulation of the correction amount FB is suppressed (restricted) particularly when the difference Δ Psec is large.

If the flag Fc is set at 1 (Fc=1) in the flowchart of FIG. 4, the program proceeds from step W50 to step W65. At step W65, the restriction in accumulation of the correction amount FB is ended, and the normal integration gain $G_N$ is read. At step W75, a value given by multiplying the normal integration gain $G_N$ by the difference Δ Psec is added to a current-time value of the correction amount FB, and this addition result is set as the updated correction amount FB. At subsequent step W85, a value given by adding the correction amount FB calculated at step W75 to the target secondary pressure Psec_tg set at step W30 is set as the command secondary pressure Psec_co. Then, at step W100, the command secondary pressure Psec_co set at step W85 is converted into an electric-current value, and this electric-current value is outputted to the secondary-pressure solenoid 76.

If the flag Fs is in the status of 0 (Fs=0) in the flowchart of FIG. 4 (i.e. if the start condition is not satisfied or if the end condition is satisfied), the program proceeds from step W20 to step W110. Accordingly, the normal secondary pressure control is performed. That is, the normal target secondary pressure Psec_tgn calculated based on the transmission input torque and the like is set as the target secondary pressure Psec_tg (at step W110). Then, the actual secondary pressure Psec obtained at step W10 is subtracted from this target secondary pressure Psec_tg, so as to calculate the difference Δ Psec (at step W120).

Then, the normal integration gain $G_N$ is read (at step W130). Then, a value given by multiplying the difference Δ Psec calculated at step W120 by the integration gain $G_N$ is added to the correction amount FB, and this addition result is set as the updated correction amount FB (at step W140). This correction amount FB is added to the target secondary pressure Psec_tg set at step W110, and this addition result is set as the command secondary pressure Psec_co (at step W150). Then, at step W100, the command secondary pressure Psec_co is converted into an electric-current value, and this electric-current value is outputted to the secondary-pressure solenoid 76. Then, the flowchart is returned.

[5. Operations]

Figure 8:
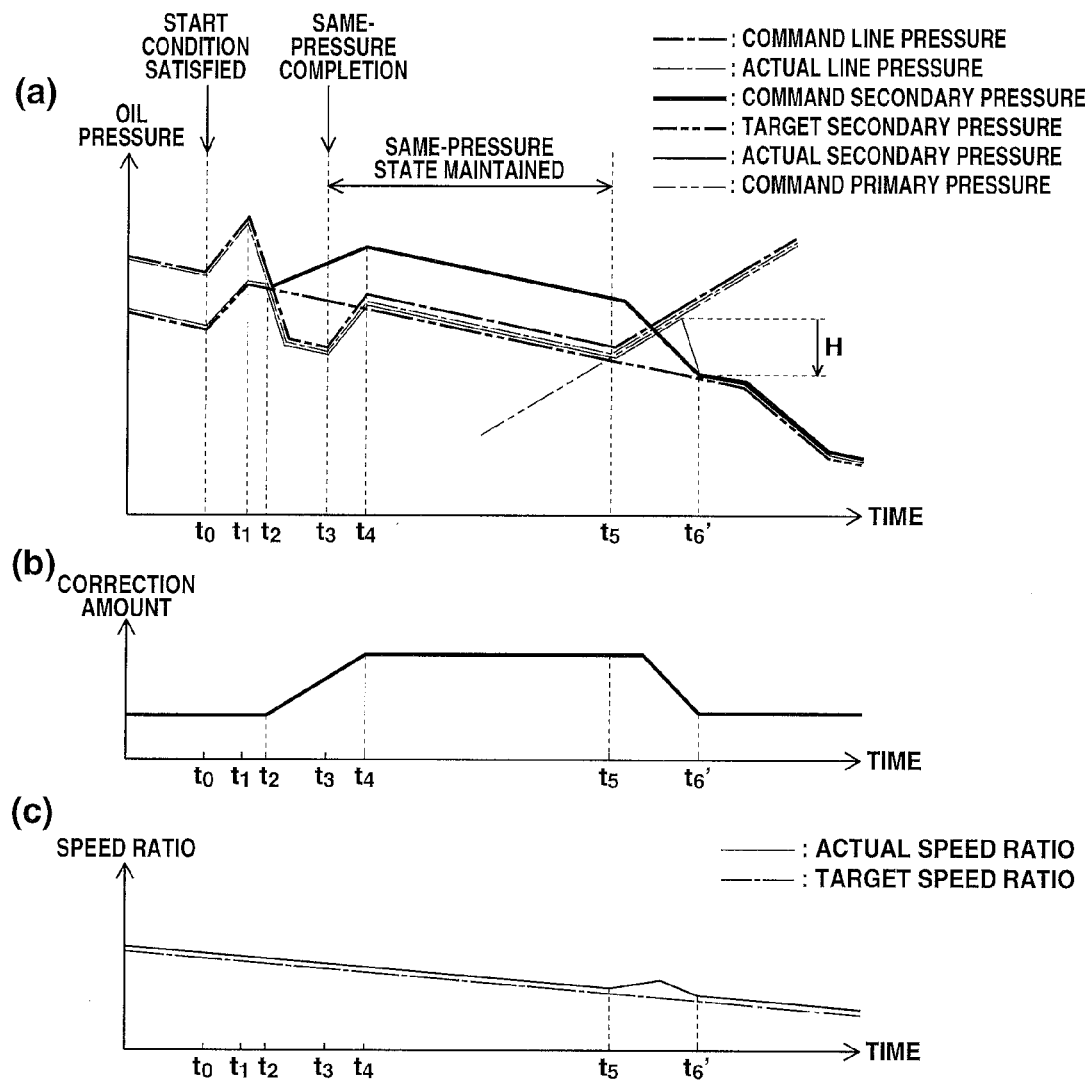
[FIG. 8] Time charts showing schematic actions of a same-pressure control which is performed in the case that a restriction section is not provided.

Next, referring to FIGS. 7 and 8, schematic actions of the same-pressure control by the CVTECU 8 according to this embodiment will now be explained. FIGS. 7(a) to 7(c) are realized by the above-mentioned CVTECU 8, whereas FIGS. 8(a) to 8(c) show a comparative example in the case that the restriction section 8d is not provided. It is noted that already-explained contents and overlapping explanations will be omitted.

As shown in FIGS. 7(a) and 8(a), when it is determined that the start condition of the same-pressure control is satisfied at time point $t_0$, the target secondary pressure Psec_tg shown by a thick alternate-long-and-two-short-dashes line is set to the target secondary pressure Psec_tgs for the same-pressure control which is given by adding the predetermined pressure Pb to the target secondary pressure Psec_tg. At the same time, the command line pressure PL_co shown by a thick alternate-long-and-short-dashes line is also increased by a predetermined pressure. In this example, the target secondary pressure Psec_tg is set such that the target secondary pressure Psec_tg rises toward the target secondary pressure Psec_tgs in a ramp shape. In the same manner, the command line pressure PL_co is set such that the command line pressure PL_co rises in a ramp shape. At time point $t_1$, the actual secondary pressure Psec shown by a thin solid line has just increased by the predetermined pressure Pb from its value of time point $t_0$ (i.e. from the initial secondary pressure Psec_pr). From this time point $t_1$, the command line pressure PL_co starts to be reduced at a predetermined gradient, and thereby, the actual line pressure PL shown by a thin alternate-long-and-short-dashes line is also reduced.

At time point $t_2$, the actual line pressure PL starts to push down (depress) the actual secondary pressure Psec. From time point $t_2$, the difference Δ Psec between the actual secondary pressure Psec and the target secondary pressure Psec_tg starts to increase. At this time, if the restriction section 8d is not provided, the integral term is accumulated with the increase of the difference Δ Psec such that the correction amount FB is gradually increased as shown in FIGS. 8(a) and 8(b) because the hydraulic feedback control using the normal integration gain $G_N$ is being applied to the secondary pressure Psec. This correction amount FB is added to the target secondary pressure Psec_tg, and this addition result is set as the command secondary pressure Psec_co. Hence, the command secondary pressure Psec_co shown by a thick solid line in FIG. 8(a) deviates greatly from the target secondary pressure Psec_tg toward a high-pressure side.

At time point $t_3$, it is determined that the same pressure has been completed. From time point $t_3$, the correction amount FB starts to be reflected in (starts to influence) the command line pressure PL_co, and thereby, the actual secondary pressure Psec gradually approaches the target secondary pressure Psec_tg such that the same-pressure state between the actual secondary pressure Psec and the actual line pressure PL is maintained. In this example, a time lag is provided for determining that the difference Δ Psec has become greater than or equal to the predetermined pressure Pc. However, the same-pressure completion determination may be done immediately when the difference Δ Psec has just become greater than or equal to the predetermined pressure Pc. Then, at time point $t_4$, the actual secondary pressure Psec converges into (reaches) the target secondary pressure Psec_tg while maintaining the same-pressure state with the actual line pressure PL. At this time, the difference Δ Psec becomes substantially equal to 0, and the correction amount FB becomes a constant value directed in a pressure-increase side by the integral term accumulated between time point $t_2$ and time point $t_4$.

This increased correction amount FB does not decrease unless the actual secondary pressure Psec becomes higher than the target secondary pressure Psec_tg, i.e. unless the difference Δ Psec becomes lower than 0 (Δ Psec<0). That is, the same-pressure state between the actual secondary pressure Psec and the actual line pressure PL is maintained while the command secondary pressure Psec_co remains in a deviated state from the target secondary pressure Psec_tg toward the high-pressure side in consequence of the integral term accumulated during the same-pressure producing process.

Then, if the magnitude relation between the actual secondary pressure Psec and the command primary pressure Ppri_co shown by a thin alternate-long-and-two-short-dashes line is inverted as a result of upshift of the speed ratio (toward HIGH side) which occurs because of an increase of the vehicle speed or a foot-depression-and-release of an accelerator, the line pressure PL starts to rise with a rise of the command primary pressure Ppri_co from time point $t_5$ at which the magnitude relation is inverted. However, the command secondary pressure Psec_co is higher than the target secondary pressure Psec_tg, and hence, the actual secondary pressure Psec rises such that the actual secondary pressure Psec is dragged by the rise of the line pressure PL as shown by a thin solid line.

That is, even though the same-pressure state between the actual secondary pressure Psec and the actual line pressure PL was ended, the actual secondary pressure Psec is dragged by the increase of the actual line pressure PL so as to cause a gap between the target secondary pressure Psec_tg and the actual secondary pressure Psec. When the actual secondary pressure Psec has risen by being dragged by the actual line pressure PL to some extent, the accumulated integral term starts to decrease so that the correction amount FB is reduced. With this reduction of the correction amount FB, the actual secondary pressure Psec rapidly falls and approaches the target secondary pressure Psec_tg.

Such a gap of the actual secondary pressure Psec directly influences a variation of the speed ratio. In particular, a vehicle occupant feels a shift shock (in speed ratio) more easily as a drop level H of the actual secondary pressure Psec becomes larger. That is, as shown in FIG. 8(c), from time point $t_5$, an actual speed ratio shown by a thick solid line varies toward LOW side relative to a target speed ratio shown by a thin alternate-long-and-short-dashes line. Because this variation of the actual speed ratio is opposite to a variation of the operating state at this time (i.e. opposite to a shifting action in speed ratio toward HIGH side), the occupant easily has a strangeness feeling. At time point $t_6'$ in FIGS. 8(a) to 8(c), the correction amount FB increased by the accumulated integral term becomes equal to 0. Near time point $t_6'$, the actual secondary pressure Psec converges into the target secondary pressure Psec_tg, and also the actual speed ratio converges into the target speed ratio.

Contrarily, in the CVTECU 8 equipped with the restriction section 8d according to this embodiment, the integration gain G for calculating the integral term of the hydraulic feedback control employs the integration gain $G_L$ for restriction, from the time point ($t_0$) at which the start condition has just been satisfied as shown in FIGS. 7(a) and 7(b). Then, from the time point ($t_2$) at which the secondary pressure Psec starts to be pushed down by the actual line pressure PL, the integration gain $G_L$ for restriction is set at a smaller value than the normal integration gain $G_N$ with the increase of the difference Δ Psec. This integration gain $G_L$ for restriction is used until the time point ($t_3$) at which the same-pressure determination is done. That is, for the period from time point $t_2$ to time point $t_3$, the accumulation of the integral term is restricted so that the increase of the correction amount FB is suppressed by a triangular area shown by a hatching pattern in FIGS. 7(a) and 7(b).

Then, the integral term starts to be accumulated according to the difference Δ Psec from time point $t_3$. Hence, the correction amount FB shown by a solid line in FIG. 7(b) takes smaller values than those of the correction amount FB shown by a dotted line of FIG. 7(b) which is given in the case that the restriction section 8d is not provided. This is because the restriction section 8d temporarily restricts the accumulation of the integral term. Accordingly, even if the actual secondary pressure Psec temporarily rises by being dragged by the rise of the line pressure PL at time point $t_5$, a drop level K of the actual secondary pressure Psec is small relative to the drop level H shown by a thin dotted line in FIG. 8(a). Therefore, as shown in FIG. 8(c), the fluctuation (variation) of the actual speed ratio, i.e. a gap amount from the target speed ratio is also small.

Moreover, the time point ($t_6$) at which the correction amount FB becomes equal to 0 is earlier than time point $t_6{'}$ of FIG. 8(a). Hence, a time length necessary for the actual secondary pressure Psec to converge into the target secondary pressure Psec_tg is short. Accordingly, as shown in FIG. 7(c), a time length ($t_5$ to $t_6$) from a time point at which the actual speed ratio shown by a thick solid line starts to deviate from the target speed ratio shown by a thin alternate-long-and-short-dashes line to a time point at which the actual speed ratio converges into the target speed ratio is shorter than a convergence time ($t_5$ to $t_6{'}$) of the gap of the actual speed ratio shown by a thick dotted line in FIG. 8(c).

[6. Effects]

Therefore, according to the above-mentioned control device for a continuously variable transmission, the command line pressure Psec_co is outputted such that the actual secondary pressure Psec becomes lower than the target secondary pressure Psec_tg, in the same-pressure control which equalizes the line pressure PL and the secondary pressure Psec with each other. By this command line pressure, the line pressure PL is reduced, and the same-pressure state between the line pressure PL and the secondary pressure psec is realized. For the period from the time point ($t_2$) at which the actual secondary pressure Psec starts to be pushed down by the line pressure PL to the time point ($t_3$) at which the line pressure PL and the secondary pressure Psec become in the same-pressure state, the accumulation of the integral term which is caused by the integral action is restricted.

Accordingly, at the time point ($t_5$) at which the same-pressure state between the line pressure PL and the secondary pressure Psec is ended, the gap amount of the actual secondary pressure Psec from the target secondary pressure Psec_tg which is caused by being dragged by the rise of the line pressure PL can be reduced. Moreover, the time length from a time point at which the actual secondary pressure Psec deviates from the target secondary pressure Psec_tg to a time point at which the actual secondary pressure Psec converges into the target secondary pressure Psec_tg can be shortened. Accordingly, a magnitude of unintended shift shock at the time of upshift which occurs under the same-pressure control can be reduced to a degree which does not affect a drivability. Moreover, a time length for which the vehicle occupant can feel a shock can be shortened.

In the case that the same-pressure control which causes the line pressure PL to become equal to the actual secondary pressure Psec is executed in the operating state where the secondary pressure Psec is higher than the primary pressure Ppri, the unintended shift shock can be reduced at the time of upshift as mentioned above. Hence, the line pressure PL can be controlled at its minimum necessary level. Accordingly, in a predetermined operating region, the discharge pressure of the oil pump 70 can be lowered, so that a friction of the transmission can be reduced. Therefore, fuel economy can be improved.

According to the above-explained control device for a continuously variable transmission, the restriction section 8d limits the accumulation of the integral term by changing the integration gain G of the hydraulic feedback control. Hence, the accumulation of the integral term can be limited by a simple control structure.

The above-explained control device for a continuously variable transmission includes the map (FIG. 3) of the integration gain $G_L$ which is set according to the difference Δ Psec given by subtracting the actual secondary pressure Psec from the target secondary pressure Psec_tg. By applying the difference Δ Psec to this map, the restriction section 8d varies the value of the integration gain $G_L$ for restriction. Hence, the accumulation of the integral term can be restricted by a further simplified structure.

In this map, the integration gain $G_L$ is set such that the integration gain $G_L$ when the difference Δ Psec is large is smaller than that when the difference Δ Psec is small. Hence, the accumulation of the integral term can be more suppressed as the difference Δ Psec becomes larger. For example, if the map is set such that the integration gain $G_L$ becomes equal to 0 when the Δ Psec is large, a value given by multiplying the integration gain $G_L$ by the difference Δ Psec is also equal to 0. Hence, in this case, the accumulation of the integral term can be stopped temporarily when the difference Δ Psec is large. Accordingly, the shift shock at the time of end of the same-pressure state can be further reduced.

According to the above-explained control device for a continuously variable transmission, it is determined that the same-pressure state between the actual secondary pressure Psec and the actual line pressure PL has been attained (i.e. the same-pressure completion) when the difference Δ Psec becomes larger than or equal to the predetermined same-pressure determination value Pc after the actual secondary pressure Psec was pushed down (time point $t_2$) under the same-pressure control. That is, the judgment section 8a performs the same-pressure completion determination by using the target secondary pressure Psec_tg and the actual secondary pressure Psec. Hence, a sensor for sensing the actual line pressure PL is unnecessary. Therefore, the same-pressure completion can be accurately determined with a cost reduction.

According to the above-explained control device for a continuously variable transmission, the line-pressure control section 8b increases the target secondary pressure Psec_tg by the predetermined pressure Pb after the start condition of the same-pressure control was satisfied and before the line pressure PL starts to decrease. In other words, the secondary pressure Psec is increased by the predetermined pressure Pb before the same-pressure producing process is started by reducing the line pressure PL. Accordingly, the clamping force of the belt 44 can be prevented from becoming insufficient due to the same-pressure control.

This predetermined pressure Pb is greater than or equal to the value (the same-pressure determination value Pc) by which the actual secondary pressure Psec is pushed down by the line pressure PL under the same-pressure control. Hence, a minimum necessary level of the clamping force of the belt 44 can be reliably secured. Moreover, hydraulic pressure is unnecessary to increase in excess, so that the friction reduction is improved.

[7. Others]

Although the embodiment according to the present invention has been explained above, the invention is not limited to the embodiment described above. Various modifications of the above embodiment are possible within ideas according to the present invention.

For example, the start condition or the end condition of the same-pressure control in the above embodiment is just one example. According to the present invention, the start condition or the end condition is not limited to the above-mentioned requirement(s). According to the present invention, the start condition of the same-pressure designed to realize the same pressure between the secondary pressure Psec and the line pressure PL has only to includes at least a requirement that the secondary pressure Psec is higher than the primary pressure Ppri. Also, the condition for the same-pressure completion determination in the above embodiment is just one example. It may be determined that the same-pressure state between the actual line pressure PL and the actual secondary pressure Psec has been completed, by sensing the actual line pressure PL. Alternatively, it may be determined that the same-pressure state has been completed when the relation (difference Δ Psec≥Pc) has continued for a predetermined time duration.

Moreover, how to change into the integration gain $G_L$ for restriction in the above embodiment is just one example. According to the present invention, how to change into the integration gain $G_L$ is not limited to the above-mentioned configuration. For example, the integration gain $G_L$ for restriction may be set by using a mathematical formula in place of the map as shown in FIG. 3. Moreover, the integration gain $G_L$ for restriction does not necessarily need to vary according to the difference Δ Psec, and instead may be a predetermined constant value. Even in the case that the integration gain G is designed to vary by using a map, such a map is not limited to the map shown in FIG. 3. The map according to the present invention may be set such that the integration gain $G_L$ varies in a curved shape in accordance with the difference Δ Psec.

Moreover, in the above embodiment, the same-pressure determination value Pc is equal to the predetermined pressure Pb by which the secondary pressure Psec is increased before the same-pressure control. However, according to the present invention, the same-pressure determination value Pc does not necessarily need to be equal to the predetermined pressure Pb. For example, the predetermined pressure Pb may be larger than the same-pressure determination value Pc. Both of the values Pb and Pc have only to be set such that the clamping force of the belt 44 does not become insufficient.

In the above embodiment, controls other than the integral action have been omitted for purpose of simplified explanations. However, the correction amount FB may be influenced also by a proportional action and/or a differential action. According to the present invention, at least the integral term by the integral action is not accumulated during the same-pressure producing process. Moreover, a vehicle according to the present invention is not limited to the vehicle equipped with only the engine as the drive source, and may be equipped with a motor as the drive source in place of the engine or in addition to the engine.

The invention claimed is:

1. A control device for a continuously variable transmission,
the continuously variable transmission including an input-side primary pulley, an output-side secondary pulley, and a belt wound around the primary and secondary pulleys,
the control device comprising:
a secondary-pressure control section configured to control a secondary pressure which is supplied to the secondary pulley, by a command secondary pressure,
wherein the command secondary pressure is given by a feedback control including an integral action based on a difference between a target secondary pressure and an actual secondary pressure,
the target secondary pressure is a target value of the secondary pressure, and
the actual secondary pressure is a detection value of the secondary pressure; and
a line-pressure control section configured to perform a same-pressure control that equalizes a line pressure and the secondary pressure with each other if a predetermined start condition is satisfied,
wherein the predetermined start condition includes an operating state where the secondary pressure is higher than a primary pressure which is supplied to the primary pulley,
wherein the line-pressure control section is configured to realize a same-pressure state between the line pressure and the secondary pressure by lowering the line pressure below the target secondary pressure in the same-pressure control, and then
control the line pressure by a command line pressure given such that the actual secondary pressure is brought to the target secondary pressure by the feedback control based on the difference between the target secondary pressure and the actual secondary pressure while maintaining the same-pressure state,
wherein the secondary-pressure control section includes a restriction section configured to restrict an accumulation of integral term of the integral action for a duration between a time point at which the actual secondary pressure starts to be pushed down by the line-pressure control section and a time point at which the same-pressure state between the line pressure and the secondary pressure is realized.

2. The control device according to claim 1, wherein
the restriction section is configured to restrict the accumulation of integral term by changing an integration gain for the hydraulic feedback control.

3. The control device according to claim 2, wherein
a map for the integration gain which is set according to a difference given by subtracting the actual secondary pressure from the target secondary pressure is provided, and
the restriction section is configured to change the integration gain by applying the difference to the map.

4. The control device according to claim 3, wherein
the map is set such that the integration gain when the difference is large is smaller than that when the difference is small.

5. The control device according to claim 1, wherein
the control device further comprises a judgment section configured to determine that the same-pressure state has been realized when a difference given by subtracting the actual secondary pressure from the target secondary pressure becomes greater than or equal to a predetermined same-pressure determination value after the line pressure is reduced by the command line pressure such that the actual secondary pressure is lowered below the target secondary pressure in the same-pressure control.

6. The control device according to claim 1, wherein
the secondary-pressure control section is configured to increase the target secondary pressure by a predetermined pressure before the line pressure is reduced by the line-pressure control section, if the start condition is satisfied.

7. The control device according to claim 6, wherein
the predetermined pressure is greater than or equal to a value by which the actual secondary pressure is pushed down by the line pressure in the same-pressure control.

\* \* \* \* \*